US012694731B2

(12) United States Patent
McZeal, Jr. et al.

(10) Patent No.: US 12,694,731 B2
(45) Date of Patent: Jul. 28, 2026

(54) SOLAR POWERED MULTILINGUAL EMERGENCY RESPONSE ROBOT AND INTERACTIVE ARTIFICIAL INTELLIGENCE SYSTEM FOR DETECTING HAZARDOUS CONDITIONS WITHIN A MOTOR VEHICLE FOR PREVENTION OF VEHICLE RELATED DEATHS

(71) Applicants:Alfred McZeal, Jr., Lafayette, LA (US); Ey Isadora-Lyphe Wade, Houston, TX (US)

(72) Inventors: Alfred McZeal, Jr., Lafayette, LA (US); Ey Isadora-Lyphe Wade, Houston, TX (US)

( * ) Notice: Subject to any disclaimer, the term of this patent is extended or adjusted under 35 U.S.C. 154(b) by 685 days.

(21) Appl. No.: 17/881,600

(22) Filed: Aug. 5, 2022

(65) Prior Publication Data

US 2024/0046719 A1 Feb. 8, 2024

(51) Int. Cl.
| | |
|---|---|
| *G08B 23/00* | (2006.01) |
| *B60H 1/00* | (2006.01) |
| *G06N 20/00* | (2019.01) |
| *G06V 20/59* | (2022.01) |
| *G06V 40/18* | (2022.01) |
| *G07C 5/00* | (2006.01) |
| *G07C 5/08* | (2006.01) |
| *H04W 4/029* | (2018.01) |
| *H04W 4/40* | (2018.01) |

(Continued)

(52) U.S. Cl.
CPC ......... *G07C 5/085* (2013.01); *B60H 1/00657* (2013.01); *G06N 20/00* (2019.01); *G06V 20/597* (2022.01); *G06V 40/18* (2022.01); *G07C 5/008* (2013.01); *H04W 4/029*

(2018.02); *H04W 4/40* (2018.02); *H04W 4/90* (2018.02); *H04W 76/50* (2018.02)

(58) Field of Classification Search
CPC ...... G07C 5/085; G07C 5/008; G07C 5/0858; B60H 1/00657; B60H 1/0073; G06N 20/00; G06V 20/597; G06V 40/18; G06V 20/56; H04W 4/029; H04W 4/40; H04W 4/90; H04W 76/50; H04W 4/44; B60R 21/0173
USPC ........................................................ 340/501
See application file for complete search history.

(56) References Cited

U.S. PATENT DOCUMENTS

| | | | |
|---|---|---|---|
| 6,930,614 B2 | 8/2005 | Rackham | |
| 6,998,988 B1 | 2/2006 | Kalce | |

(Continued)

*Primary Examiner* — Tai T Nguyen

(57) ABSTRACT

Presented is an artificial intelligence interactive Emergency Response Robot for detecting hazardous conditions within a motor vehicle for the prevention of vehicle related deaths. A Virtual Robot based on IBM's Watson cognitive super-computing platform continuously monitors the internal and external environment of the motor vehicle and will automatically commence a rescue sequence in the event it detects a dangerous condition such as a child, or pet left abandoned in an overheated vehicle is detected.

When life threatening conditions are detected, the robot's ai simulates a human emergency responder to immediately dispatch assistance to the location and will assume control of the vehicle's electronic system to make adjustments in the environment.

The invention functions provides a universal method of connecting artificial intelligence to any vehicle for preserving lives and a method for speedy assistance to victims, and emergency response teams interacting in real time and will substantially decrease vehicle related deaths.

35 Claims, 12 Drawing Sheets

(51) Int. Cl.
   *H04W 4/90*       (2018.01)
   *H04W 76/50*     (2018.01)

(56)            References Cited

U.S. PATENT DOCUMENTS

| | | | | |
|---|---|---|---|---|
| 7,714,737 | B1 | 5/2010 | Morningstar | |
| 11,417,109 | B1 * | 8/2022 | Theimer | G06N 3/08 |
| 2017/0279957 | A1 * | 9/2017 | Abramson et al. | G06F 21/36 |
| 2020/0344602 | A1 * | 10/2020 | Li | H04L 67/125 |
| 2022/0068114 | A1 * | 3/2022 | Baldwin | B60Q 1/52 |
| 2022/0148423 | A1 * | 5/2022 | Asakura | G08G 1/166 |
| 2023/0221942 | A1 * | 7/2023 | Zhang | G06F 8/71 |
| | | | | 717/168 |
| 2023/0234536 | A1 * | 7/2023 | Yamagata | B60R 25/25 |

* cited by examiner

FIG 1. - Solar Powered Multilingual Emergency Response Robot And Interactive Artificial Intelligence System For Detecting Hazardous Conditions Within a Motor Vehicle For Prevention of Vehicle Related Deaths.
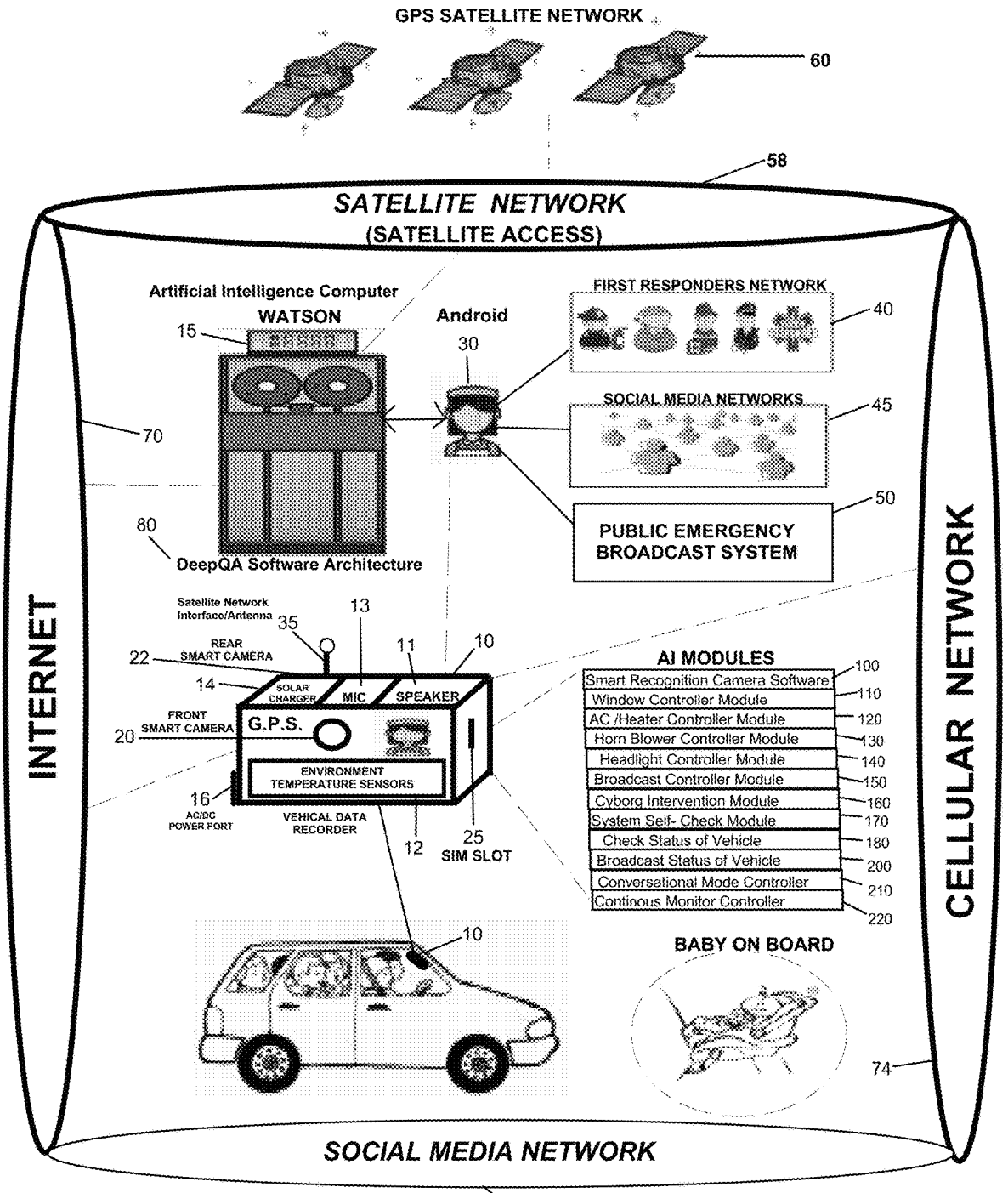

FIG 2.

WATSON - TRANSFER LEARNING
3 LEVEL ARTIFICIAL INTELLIGENCE MODEL

LEVEL 1.  CUSTOMER LEARNING LEVEL

90

WATSON QUERY TO VECHICLE ATMOSPHERE

WATSON DIALOG WITH  HUMAN USERS

WATSON DIALOG WITH VEHICLE USERS

WATSON DIALOG WITH HOSPITAL PERSONNEL

WATSON DIALOG WITH EMERGENCY RESPONDERS

WATSON DIALOG WITH SOCIAL MEDIA NETWORKS

WATSON DIALOG WITH VEHICLE BLACKBOX DATA

CYBORG

LEVEL 2. SPECIFIC INDUSTRY KNOWLEDGE

AUTOMOTIVE MANUFACTURING INDUSTRY

EMERGENCY RESPONSE INDUSTRY

MEDICAL INDUSTRY / MEDICAL DOCTOR

TELECOMMUNICATION INDUSTRY

COMPUTER SCIENCE / AI PROGRAMMING

ARTIFICIAL INTELLIGENCE

EMERGENCY RESPONSE TRAINING

VEHICLE MAINTENANCE (UNIVERSAL)

FACIAL RECOGNITION INDUSTRY

MULTI-LANGUAGE INDUSTRY

GEOLOGICAL INDUSTRY

SATELLITE  INDUSTRY

CARE TAKER PROFESSION

MACHINE LEARNING

CONVERSATIONAL MODE

EMERGENCY ROOM

OPERATIONS RESEARCH & STATISTICS

LEVEL 3.   GENERAL KNOWLEDGE

WIKIPEDIA, MULTI-LINGUAL, SEARCH ENGINES ACCESS

INTERNET COMMUNICATIONS,  SOCIAL MEDIA NETWORKS

KNOWLEDGE OF ALL 911 AND EMERGENCY SERVICES WORLDWIDE

GENERAL ELECTRONIC VEHICLE CONTROL KNOWLEDGE -

EMERGENCY RESPONSE KNOWLEDGE

VEHICLE MANUAL OPERATIONS (ALL VEHICLES)

GENERAL SATELLITE COMMUNICATIONS

GENERAL CELLULAR COMMUNICATIONS

FIG 3. - A.I. VEHICLE DATA RECORDER
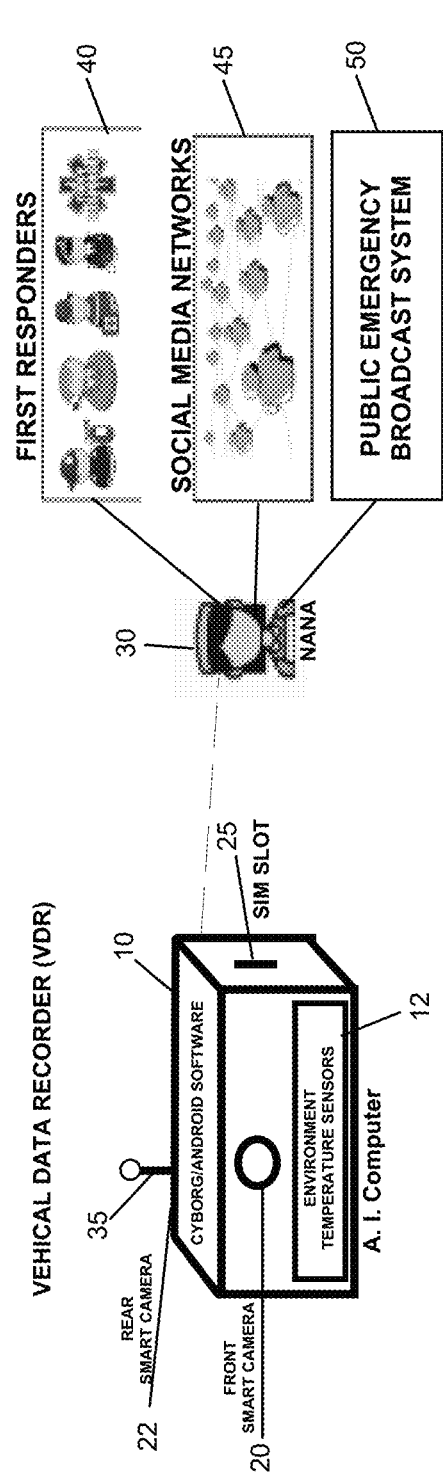

FIG 4. - NANA ROBOT COMMUNICATING WITH HUMANS FOR EMERGENCY DISPATCH
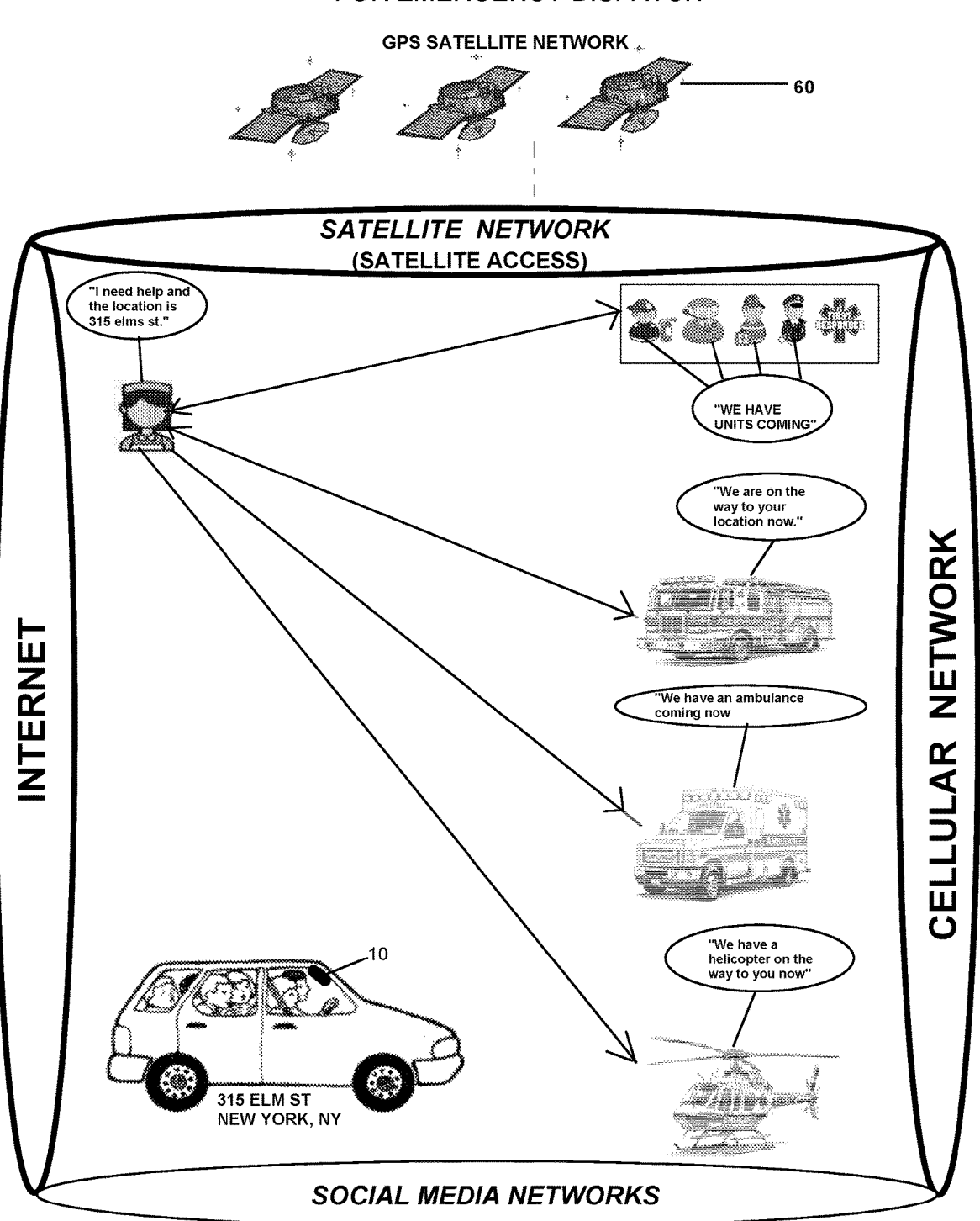

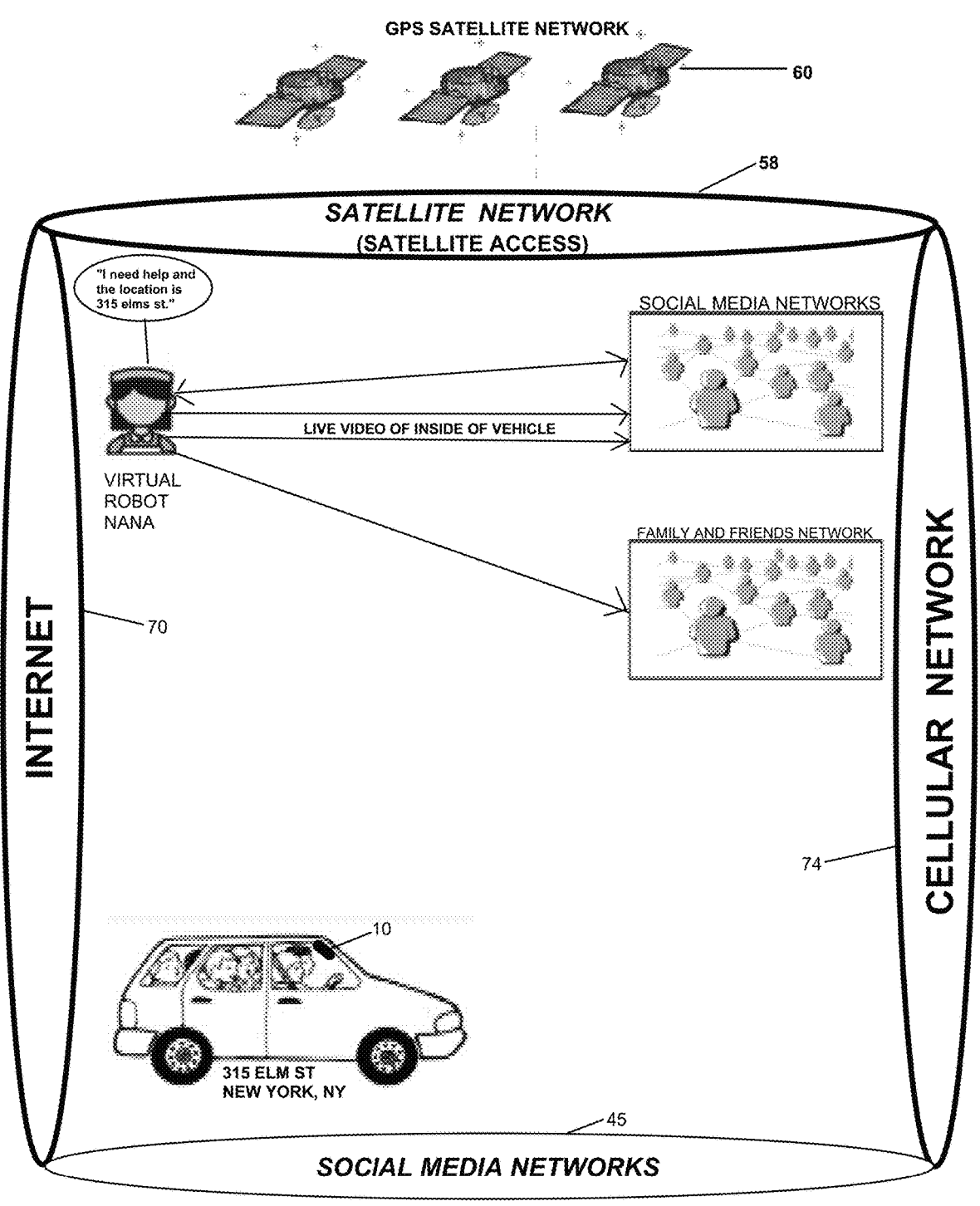
FIG 5 - NANA ROBOT COMMUNICATING WITH SOCIAL MEDIA FOR EMERGENCY DISPATCH

FIG 6 - NANA ROBOT COMMUNICATING TRANSMITTING INTERNAL VEHICLE DATA OVER A CELLULAR OR SATELLITE NETWORK TO WATSON
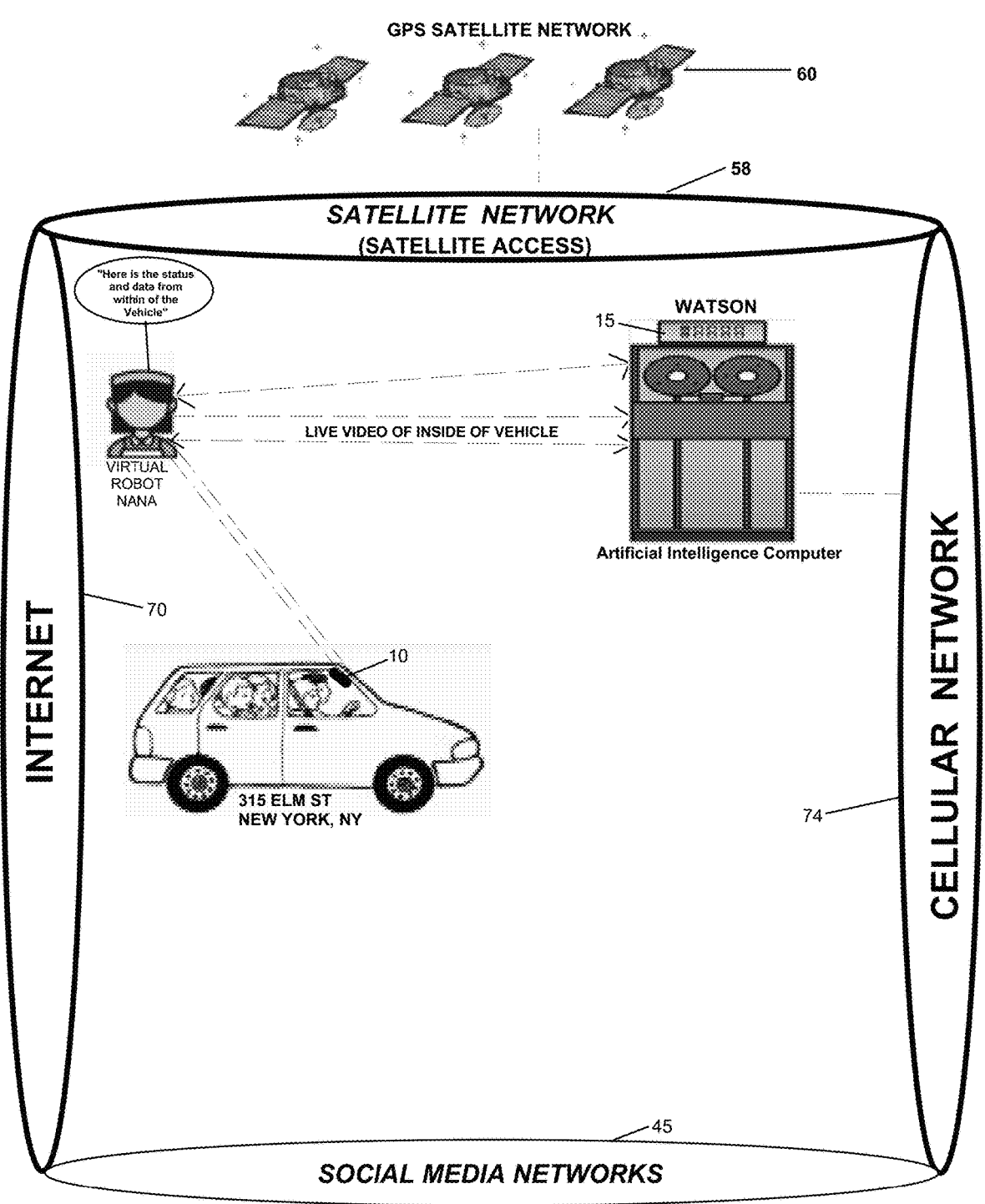

FIG 7 - NANA ROBOT USING INTERNAL ENVIRONMENTAL SENSORS
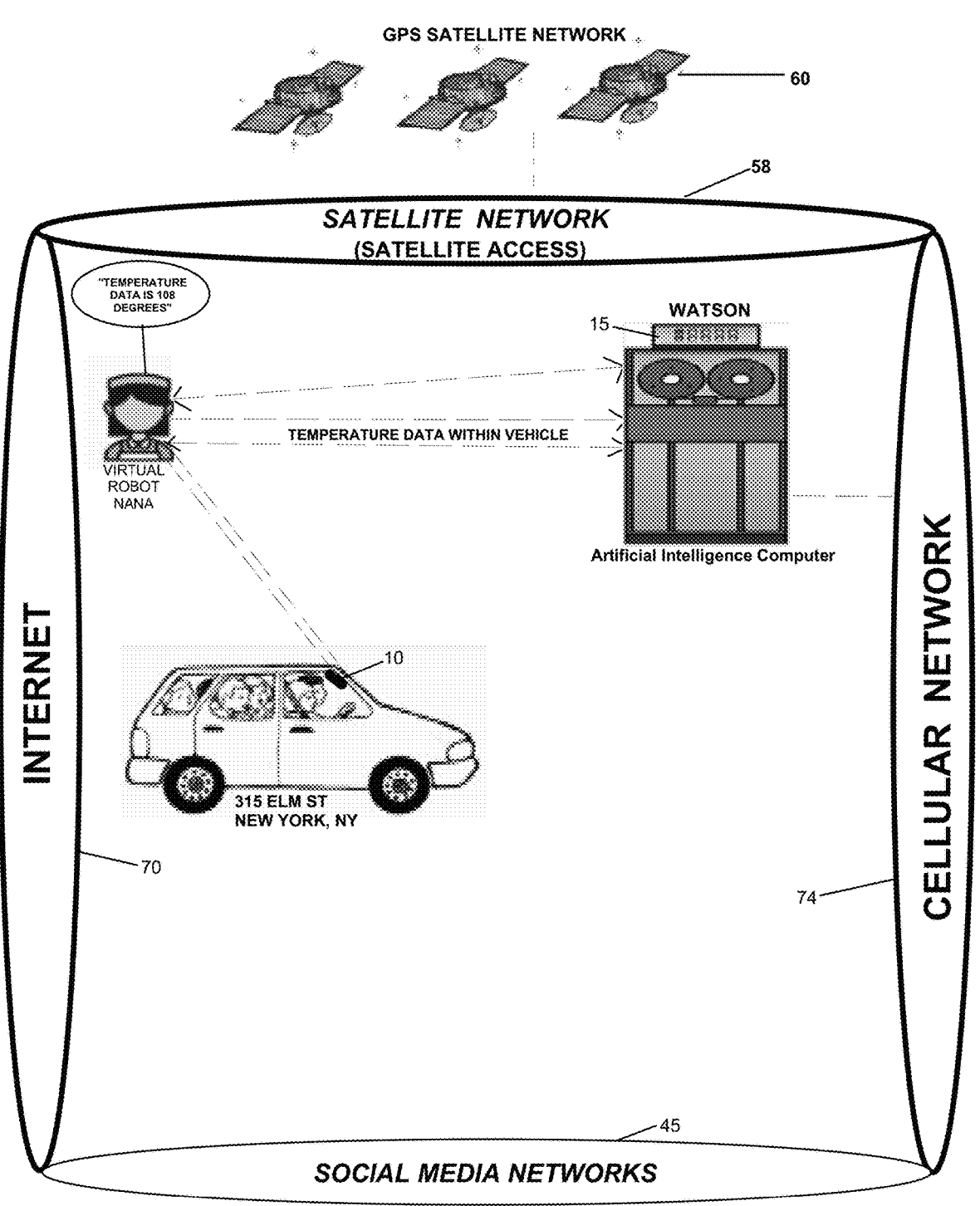

FIG 8 – NANA ROBOT USING ACCESS THE ELECTRONIC OF A VEHICLE TO CONTROL THE ENVIRONMENT FOR SAFETY
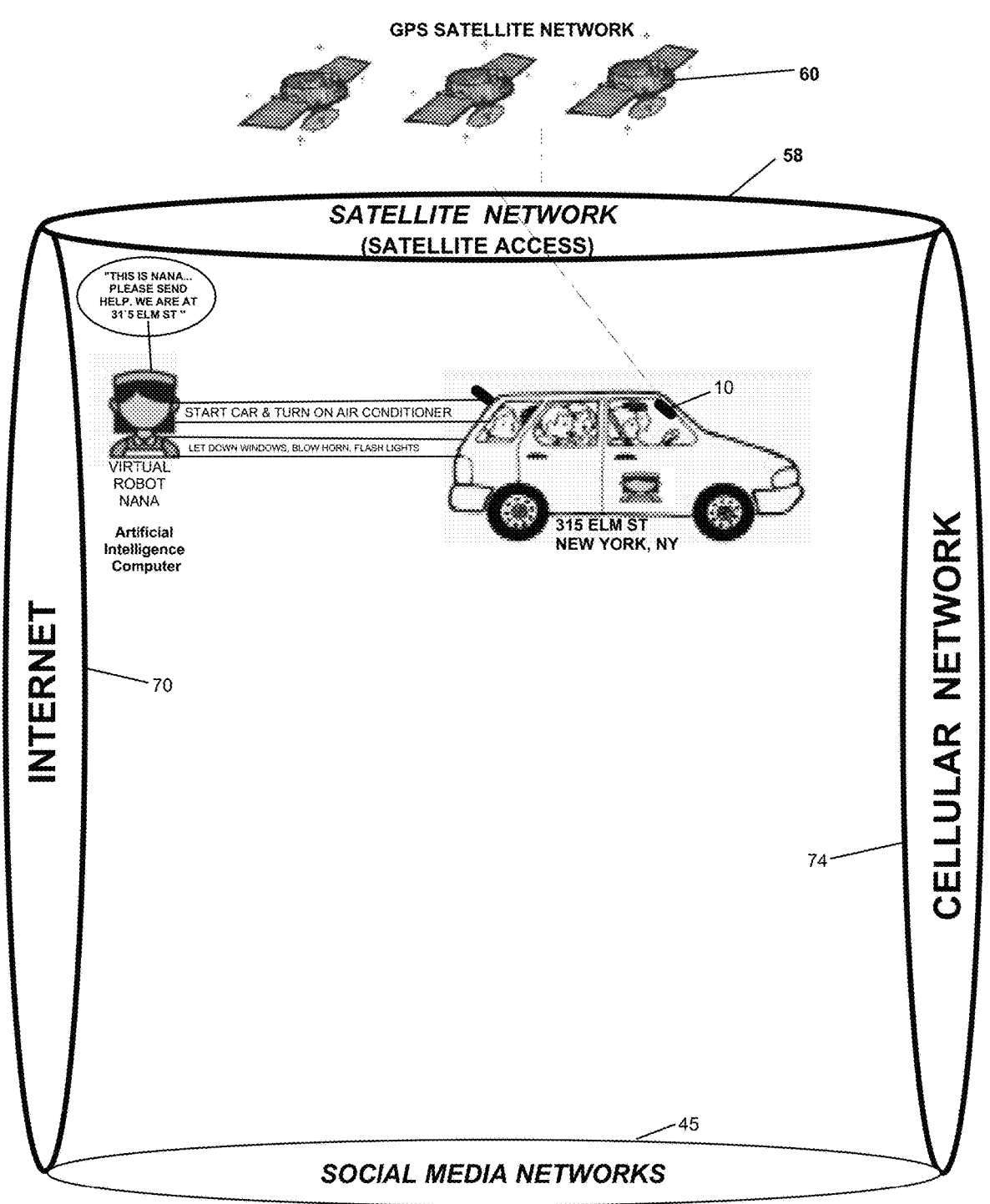

FIG 9 - NANA ROBOT USING ACCESS THE ELECTRONIC OF A VEHICLE TO CONTROL THE ENVIRONMENT FOR SAFETY
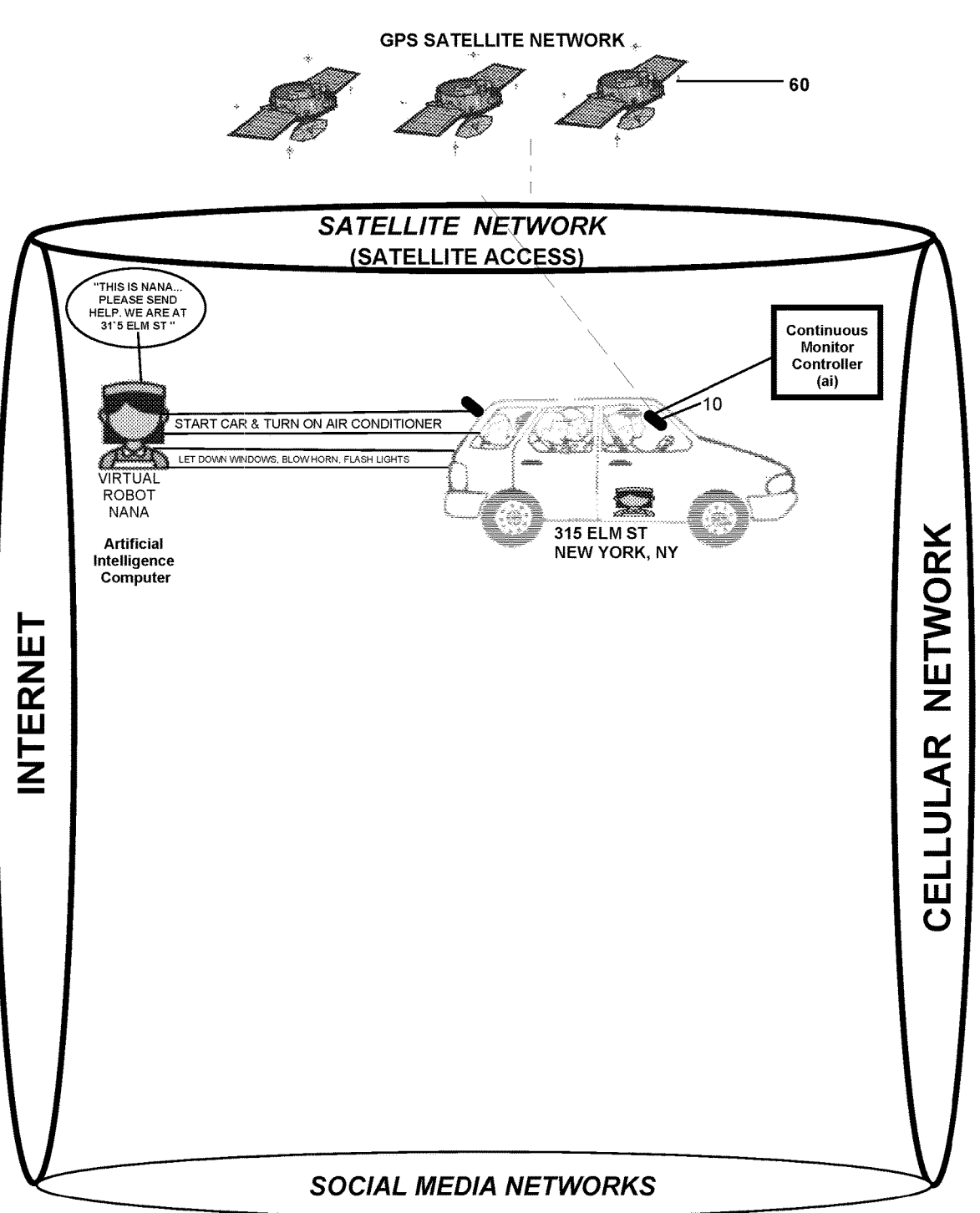

FIG 10. - DIRECT ACCESS TO NANA
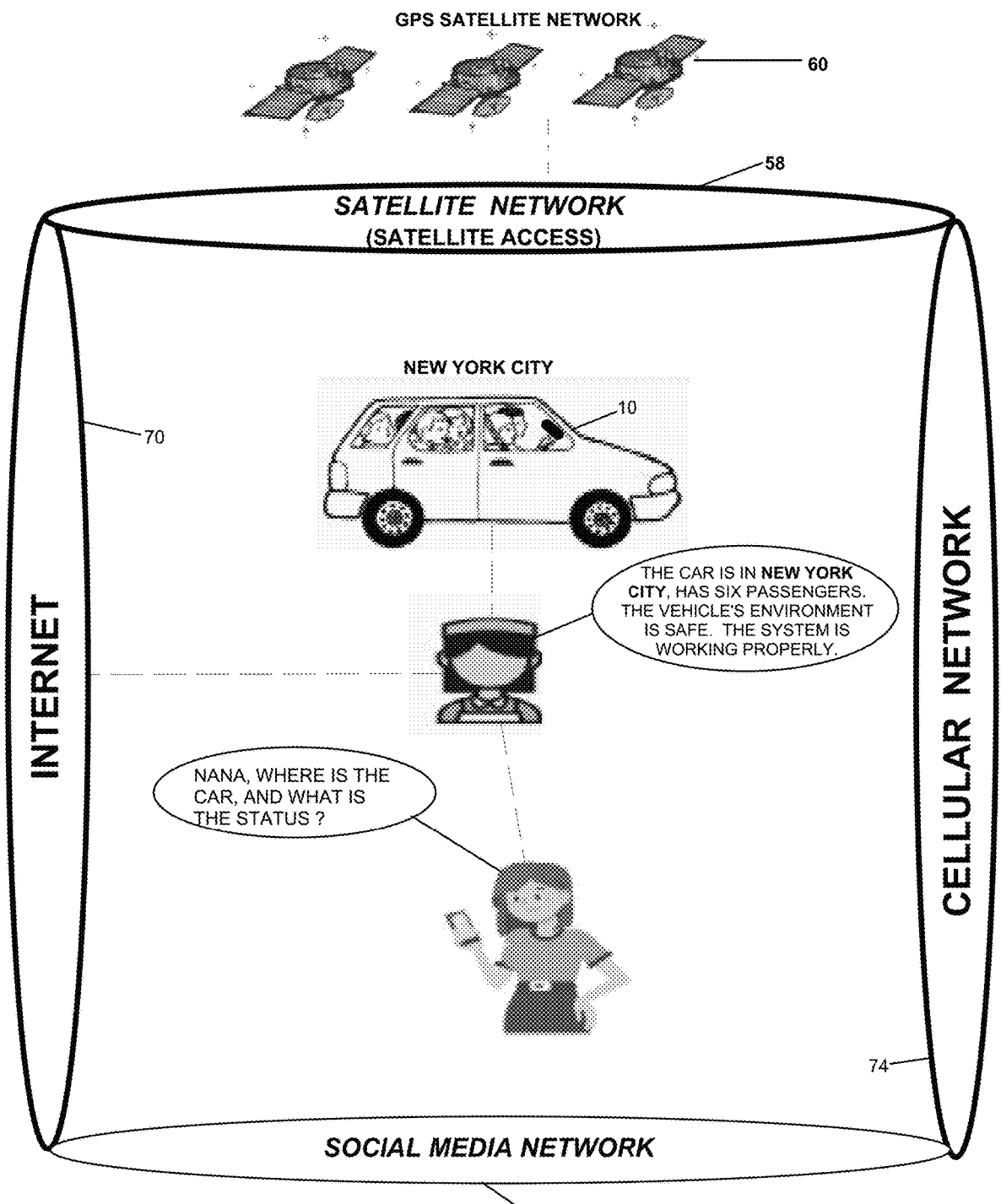

FIG 11. - DIRECT ACCESS TO VEHICLE OCCUPANTS VIA NANA
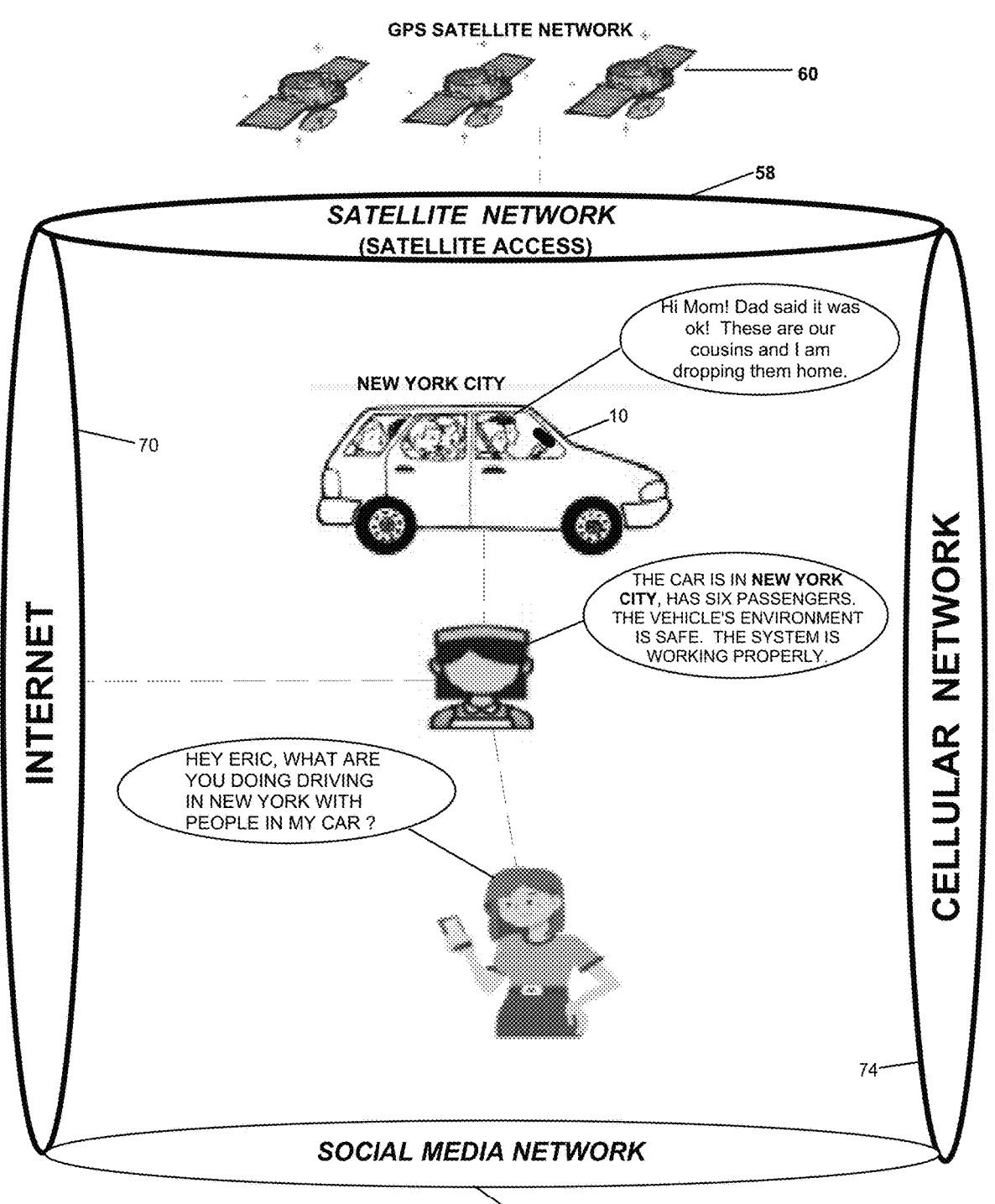

FIG 12. - INTERACTIVITY WITH SOCIAL MEDIA USERS
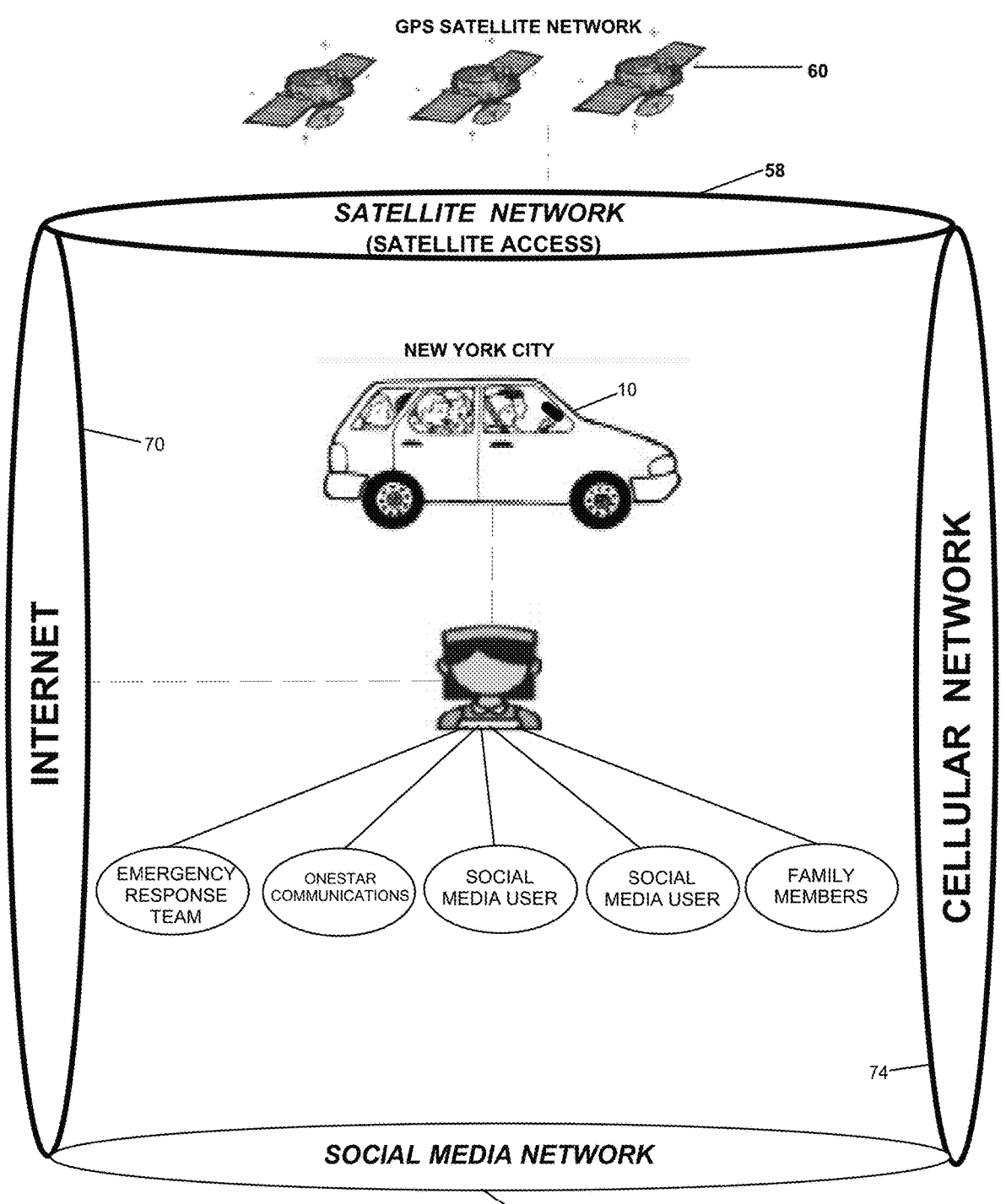

SOLAR POWERED MULTILINGUAL EMERGENCY RESPONSE ROBOT AND INTERACTIVE ARTIFICIAL INTELLIGENCE SYSTEM FOR DETECTING HAZARDOUS CONDITIONS WITHIN A MOTOR VEHICLE FOR PREVENTION OF VEHICLE RELATED DEATHS

RELATED APPLICATIONS

This application claims priority of provisional patent application No. 63/133,484 filed on Jan. 4, 2021 by inventors Alfred McZeal, Jr. and Ey Isadora-Lyphe Wade for An Emergency Response Robot & Interactive Cognitive Communication System For Detecting Hazardous Conditions Within A Vehicle With Immediate Follow Up For Prevention of Vehicle Related Deaths

SEQUENCE LISTING OF COMPUTER PROGRAMS AND AI MODULES

1. IBM's DeepQA Software—IBM WATSON Operating System For Driving The Invention
2. "NANA" Virtual Robot for Simulating A Emergency Response Professional which connects to and interacts with WATSON.
3. Data Collection A.I.—Module—for collecting environmental data from Vehicle to be sent to Watson.
4. Conversational Mode—for Communicating with Rescue Teams and Humans in Real Time regarding the Status of A Motor Vehicle's environment and general system status.
5. Smart Recognition Camera software (a.i.)
6. Window Controller Module (a.i)
7. Air Condition/Heater Controller Module (a.i.)
8. Conversational Mode Controller (a.i.)
9. Cyborg Intervention Controller (a.i)
10. Continuous Monitor Controller (ai)
11. Horn Blower Controller Module (a.i.)
12. Nana Ai Robot Module (a.i)

FIELD OF THE INVENTION

The field of the invention relates to Artificial Intelligence, and more specifically to a Solar Powered Multilingual Emergency Response Robot and artificial intelligence system for detecting hazardous conditions within a motor vehicle for the prevention of vehicle-related deaths. The invention implements "TRANSFER LEARNING", a subset of artificial intelligence and a machine learning technique in IBM's Watson that allows a machine to immediately learn a skill or profession similar to a human, without the process of time in order to acquire the skill. In this invention, Transfer Learning creates a virtual robot identified as "Nana" to provide intelligent human-like communications, interacting in real-time with emergency first responders and users to prevent vehicle-related deaths. A virtual robot acts as an emergency response professional providing continuous protection from vehicle-related death that has claimed the lives of millions. The field relates to Computer Science and in particular, Artificial Intelligence.

BACKGROUND OF THE INVENTION

I. Introduction—the Problem

Children, Humans, and Pets are Routinely Left in Overheated or Danger Vehicles Die from Heat Exhaustion or Dangerous Environments without Timely Help One of the problems in modern day society is that infants, children, elderly, disabled persons, and pets are routinely left in hazardous or overheated vehicles which results in deaths from heat exhaustion.

A study by the Department of Meteorology & Climate Science, San Jose State University relative to "Heatstroke Deaths of Children in Vehicles was an examination of media reports indicated about 832 child vehicular heatstroke deaths occurred for a 18-year period (1998 through 2019) and shows the following statistics:

54%—child "forgotten" by care giver (356 Children)
29%—child playing in unattended vehicle (189)
17%—child intentionally left in vehicle by adult (111)
1%—circumstances unknown (5)

These statistics do not represent the unreported incidents of when children or pets or left alone in hot vehicles. At least 832 children have died due to Pediatric Vehicular Heatstroke (PVH) since 1998. The children that have died from vehicular heatstroke in the United States (1998-2019) have ranged in age from 5 days to 14 years. More than half of the deaths are children under 2 years of age.

Below are the percentage of total deaths (and the number of deaths).

<1-year old=32% (257); 1-year old=22% (176) 2-years old=20% (151) 3-years old=13% (113) 4-years old=6% (45) 5-years old=4% (28); 6-years old=1% (8); 7-years old=<1% (3); 8-years old=<1% (3); 9-years old=<1% (2); 10-years old=<1% (3); 11-years old=<1% (2); 12-years old=<1% (1); 13-years old=<1% (1); 14-years old=<1% (2); Unknown=<1% (1) (source: Wikipedia)

Some incidents may go unreported due to the criminal nature and liability when a person (including a parent) negligently leaves a child in a hot vehicle and abandoned. (Source: https://www.noheatstroke.org)

Thus the problem is that timely help cannot be rendered to victims to avoid dangerous vehicle related deaths. This invention address this problem using Artificial Intelligence, GPS, and satellite technology.

Immediate Help and Emergency Assistance is Not Available to Victims in Time to Avoid Vehicle Related Deaths Presently there is no artificial intelligence means for immediate discovery and assistance to victims who may be trapped in a dangerous or overheated vehicle or where the environment is fatal to humans and pets, such as overheated vehicle or a silent carbon monoxide infiltration into a vehicle.

Often times vehicle accidents happen in remote areas, where the victim or victims are unconscious and cannot help themselves such as persons who may have just been involved in a serious accident or who may have fallen asleep in a vehicle where carbon monoxide has made the vehicle uninhabitable for humans or pets.

Additionally, in many instances, the location of the accident or critical situation is not known to emergency service providers, medical personnel, and the public which can assist in a rescue of an individual(s) in serious danger, if they only knew of the location.

When a critical situation becomes apparent, then medical or another life-saving assistance is critically needed immediately in order to repair the environment and to dispatch assistance to the location as soon as possible in order to preserve life. This invention uses artificial intelligence to immediately assist in critical situations and will address the general problems where people and pets are left alone to die in dangerous vehicles without immediate assistance.

Wireless communications, continuous monitoring, and the cognitive capabilities of IBM's WATSON AI systems allow for these problems to be easily addressed in real-time using cognitive systems, virtual robots, or androids to assist in the process of emergency dispatch for any vehicle for the preservation of life.

II. Previous Approaches to the Problem

There appears to have been some previous approaches to the problem of attempts to build systems to avoid heated vehicles or dangerous environments which concerns the purpose of avoiding vehicle-related deaths.

However, none of these approaches seem to address the problem using artificial intelligence in real-time, whereas the dangerous environment is immediately detected and addressed, and where emergency help is immediately dispatched to the location where the problem is occurring. In this invention, problems are pre-detected and resolved on a proactive basis with artificial intelligence. The following patents appear to be relevant to the present patent application:

III. U.S. Patents & Publications

| Patent/Pub Number | Kind of Code | Issue Date | Patentee |
|---|---|---|---|
| 7,714,737 | | May 11, 2010 | Morningstar |
| 6,998,988 | | Feb. 14, 2009 | Inventor Kalce |
| 6,930,614 | | Aug. 16, 2005 | Rackham |

The above patents and publication are considered prior art and all of these attempt to address the same problem of abandoning a human or infant in overheated vehicles. Most of the prior art found and discussed herein are related to problem-solving from an "Alarm Status" point of view, whereby an alarm is signaled to alert a human that a child is left unattended in an overheated vehicle. However, none of the above-cited inventions uses Artificial Intelligence to assist in the problem-solving process of actual rescuing the victims.

With the advent and influx of Artificial Intelligence, new insights and new capabilities can now be realized as a viable solution for preserving life.

Additionally, the problem must be addressed from a view of a "dangerous environment" and not simply an overheated environment because there exist many different form. In any case where an environment becomes uninhabitable for a human or pet, then this condition would need to be immediately addressed.

There appears no prior art for addressing a dangerous environment in this context with Artificial Intelligence.

Warning System for Child Left Unattended in Vehicle

| Patent/Pub Number | Kind of Code | Issue Date | Patentee |
|---|---|---|---|
| 7,714,737 | U.S. PATENT | May 11, 2010 | Morningstar |

U.S. Pat. No. 7,714,737 issued on May 11, 2010 to Inventor Morningstar is a warning system for notifying another person when a child is left in a child safety seat.

The system recognizes a child in a child safety seat by either a pressure pad or a secured child seat lap belt.

The system is activated by the release of the driver's seat belt. Should a child remain in the seat when the driver's seat belt is disengaged, the system alarms notifying the driver of such. The alarm would include a calm audio output such as a lullaby, a song, or a story.

The system can be integrated into the OEM features to provide an alert escalation process using a local alert, a vehicle alert, a wireless alert and ultimately a 911 alert.

This system is triggered when the driver's seat belt is released and if there is a child in the seat when the driver's seat belt is disengaged, the system will alarm the driver of such whereas the alarm in this instance would be a calm audio output such as a lullaby, a song, or a story.

The Downside of the Invention

This would appear to be a viable solution. However, the solution is dependent on the driver's seat belt functioning, the disengagement of the seat belt, and also on the complete actions and consciousness of the driver. If anyone of these elements failed, then the victim would not receive speedy assistance and the alarm would fail to provide the actual rescue to the victim still trapped in the child's seat within the car.

Infant Alarm System for an Automobile

| Patent/Pub Number | Kind of Code | Issue Date | Patentee |
|---|---|---|---|
| 6,998,988 | U.S. PATENT | Feb. 14, 2009 | Inventor Kalce |

U.S. Pat. No. 6,998,998 issued on Feb. 13, 2009 by Inventor Kalce is an infant alarm system for automobiles for alarming when the driver seat is unoccupied has a pressure sensor pad for detecting the presence of a person in a car seat.

A belt buckle switch is for determining whether a belt buckle is buckled into an infant car seat. A control box is electrically connected to the pressure sensor pad and the belt buckle switch. The control box is for outputting an alarm signal when the belt buckle switch indicates that the belt buckle is buckled into the infant car seat and the pressure sensor pad does not detect the presence of the person in the car seat.

The Downside of the Invention

Similar to the previous invention discussed this invention would also appear to be a viable solution however, the solution again is dependent on the control box for outputting an alarm signal when the seat belt functioning, the disengagement of the seat belt, and also on the complete actions and consciousness of the driver.

If any one of these elements failed, then the victim would not receive speedy assistance and the alarm would not serve to provide a rescue to the victim which is still trapped in the child's seat.

Overall even if all the elements worked in a perfect situation there would be a problem if the alarm is not immediately addressed by a human in order to remedy the situation of a child being left in a vehicle.

Smart Occupant Alarm System

| Patent/Pub Number | Kind of Code | Issue Date | Patentee |
|---|---|---|---|
| 6,930,614 | U.S. PATENT | Aug. 16, 2005 | Rackham |

U.S. Pat. No. 6,030,614 is an occupancy alarm system which can be integrated into a motor vehicle or can be portable. The occupancy alarm system may be programmed to communicate with a program within a logic unit of the on-board computer within the vehicle or a cellular telephone or other wireless logic device so that if the driver's door is open and the engine is turned off but there still is an occupant in the motor vehicle, an alarm is immediately triggered.

The GPS coordinates of the motor vehicle or the cellular telephone or other wireless device may be communicated to a remote location service or a local emergency center as part of the alarm. The occupancy sensor may be mounted on the occupant or on the restraint system, and may interact with an ambient temperature sensor and an alarm, both of which may be integrated into a motor vehicle, to indicate that a dangerous condition exists for an occupant within the motor vehicle. The occupancy sensor, the ambient temperature monitor, and the alarm may further be integrated together for a portable alarm system or may be mounted or otherwise integrated onto a portable restraint system.

The occupancy alarm system may provide an interface and an override such that when the occupant remains in a potentially hazardous environment, that state is communicated via the interface and, if monitored by a responsible adult, the alarm can be overridden.

Similar to the previous inventions cited herein, the invention is based upon an alarm and a responsible and conscious human to address the hazardous condition.

IV. Disadvantages of the Prior Art

The Prior Art is Dependent Upon a Responsible Human and an Alarm System which does not Immediately Correct the Environment for the Victim or Summon Help Presently there are several solutions that attempt to address the issue of providing an alarm when in a dangerous vehicle environment. Many of these solutions are based upon the alarm system functioning properly, and a conscious and responsible human being who can respond to the alarm and eliminate the threat of death or a vehicle fatality. As such many of these systems do not provide the immediate action which is required in a real-world situation. There are a wide diversity of situations that could happen in the real world that would threaten a person's life while being trapped in a dangerous vehicle environment.

The Key to Survival

The key to survival in a real-world critical situation is to respond as quickly as possible to critical situations when they occur. Response means taking action now to modify or even totally eliminate the dangerous condition in real-time.

Addressing Problems before they Occur

Another major key to avoid a critical situation is by continuously monitoring a vehicle's environment and addressing problems before they occur. The ability to immediately communicate with and to dispatch responsible human assistance to a troubled location is also paramount when human life is at risk. The critical functions discussed above can be implemented with artificial intelligence.

The ability of an intelligent machine to execute immediate assistance and to resolve problems in real-time is of great merit when time is of the essence and human life is at stake.

V. A Viable Solution

Watson'S (AI). Human Experts and Artificial Intelligence can Assist to Avoid Vehicle Fatalities

Cognitive Computing vs. Programmable Systems

IBM'S WATSON ("WATSON") is an Artificial Intelligence super computing environment described by IBM as cognitive computing. Cognitive Computing are systems that reason about a problem the way a human does, except with massive speed and skill.

This type of computing is a radically new kind of computing very different from the programmable systems that preceded it, as different as those machines were from the tabulating machine over a century ago. Cognitive computing enables people to create a profoundly new kind of value finding new insights locked away in volumes of data in order to enhance human expertise.

Conventional computers today are programmable systems based upon mathematical principles that emanate from the 1940's are programmed based on rules and logic intended to derive mathematically precise answers, often following a rigid decision tree approach. However, with today's wealth of big data such a approach fails to keep up with the wealth of big data because 80% percent of data today is unstructured data. WATSON can seemingly process unstructured data.

Connecting Vehicle Data to Watson

Connecting WATSON to any vehicle's environment in real time using a wireless network to monitor that environment has many benefits. Connecting the vehicle's environment to WATSON is a relatively easy task to one skilled in the art and has great potential in predicting vehicle problems and maintaining the safety of its passengers. Once WATSON is connected, the car's environment is now enabled with AI features that can be exploited to predict and shape future outcomes while automating complex processes for emergency response teams according to learned responses.

The present state of the art of vehicle alarm systems is such that the solutions only offer alarm based responses which do not guarantee a swift and speedy recovery for a dangerous situation. However, by connecting WATSON to the car's environment can be monitored in real time such that when any kind of danger occurs, immediate response to correct it can be accomplished.

XI. Dictionary of Terms Used

AI., Android, Cyborg, Nana, Watson, Virtual Robot

The following terms are used throughout the specification and has been specifically defined here in order to avoid confusion and to present a better understanding of the invention to one skilled in the art. Some of these terms are used interchangeable but mean the same thing and are being used in the context of the situation being presented.

A.i means Artificial Intelligence

"ANDROID" means a separate and distinct artificial intelligence and expert system capable of machine learning and interacting with IBM WATSON cognitive system to carry out the functions of a human and is equivalent to Cyborg and NANA.

"WATSON" as used herein means IBM Watson question-answering super computer artificial intelligence system capable of answering questions posed in natural language developed by IBM's DeepQA project by IBM corporation and named after IBM's founder and first CEO, industrialist Thomas J. Watson.

"Cyborg"—A independent artificial intelligence expert system using AI machine learning programs having the ability to reason like a human and can execute artificial intelligence programs independently on its own, as well as communicate with WATSON or other AI sources, including humans for extended intelligence and knowledge. The term here is used to synonymously refer to "NANA" an Ai module, Android, and virtual robot that simulates a real human emergency response expert and servant having real time human like access to 911 operators, a satellite network, GPS System for locating emergencies, and the intrinsic ability to intercommunicate with humans in natural language, and to control every aspect of vehicle's electronic system.

"Dangerous or Hazardous Condition"—mean any hazardous condition which is uninhabitable for humans and pets, including but not limited to, overheated vehicle, carbon monoxide, or other dangerous conditions where humans would be harmed or could not survive if left in that hazardous condition.

"Emergency Response Team"—the term Emergency Response Team means a body of individuals or group authorized to respond to and be dispatched to a critical or emergency situation to provide support, medical assistance, and rescue, and can include, 911 systems operators, e911 systems, police systems, social media contacts, personal contacts, family members, and any other source that can be utilized to cause an immediate dispatch to an emergency situation.

"NANA" is synonymously used interchangeably with the term Cyborg where both have the same meaning. "NANA" is a "virtual nanny" caretaker, Emergency Response Robot and has the intrinsic ability to learn similar to a Human person based on its own experiences with humans, and access to all systems interconnected to it.

"Virtual Robot"—is used to synonymously refer to an Android, Cyborg NANA as defined above.

"Wireless Vehicle Data Recorder" a wireless data recorder system for recording a vehicle's atmospheric data of a vehicle, and general conditions of the vehicle for subsequent use by Watson and NANA in predicting, reporting and avoiding mechanical failures that could cause a dangerous uninhabitable environment in the vehicle.

Robotic Control—means an artificial intelligence system of ai modules capable of interconnecting with a vehicle's electronic system to assume automated control over the vehicle's internal environment for the purpose of adjusting the vehicle's environment until emergency personnel can arrive to the location where a problem is occurring.

Machine Learning, Transfer Learning, Natural Language Processing, of a Vehicles Environment can Assist Emergency Personnel & Social Media Watson is an artificial intelligence system. Artificial intelligence is what gives machines the power to learn, adapt to new inputs, and make better decisions. Computer Algorithms using cognitive computer systems, Artificial Intelligence (AI) and machine learning such as IBM's Watson, can extract and process massive amounts of environmental and statistical data in real time from the vehicle's environment, and also process in real time to discover problems, and glean insights into the environment, and can even take corrective action to avoid problems.

Natural Language Processing

Watson is a Question & Answer system. Once environmental data has been collected questions can be posed to Watson in natural language where a real human like dialog can take place between machine and man. Information from the internal environment, could be used by Watson to communicate with end users, emergency responders, family, and friends to ask questions related to the vehicle's internal environment. Discovery of new insights are unlocked away in the massive amounts of intelligent data contained the vehicle's environment that would otherwise be unknown.

Watson can also discover new insights from the data using advance statistical modeling, operation research, and advanced AI algorithms that could provide for safety of the vehicle's environment and can also advise people and emergency responders on what action to take to ascertain the safety of the environment and the passengers in the vehicle.

Transfer Learning

Transfer Learning is a subset of artificial intelligence and a machine learning technique in Watson that allows a machine to immediately learn a skill or profession similar to a human, without the process of time in order to acquire the skill. AI modules can be developed whereas the NANA ai can learn via Watson can be taught the same knowledge of a professional emergency response person, a medical doctor, and can in fact can monitor and control the vehicle's internal functions, such as an air conditioner, open/close windows, and other functions in order to modify the environment and place it in a habitual and safe condition for humans.

Sensors Within a Vehicle can be Used in Conjunction with Watson to Continuously Monitor Dangerous Environments for Immediate Follow Up An electronic sensor having wireless communication properties can be utilized in a vehicle in conjunction with WATSON to continuously monitor the vehicle's environment for dangerous situations. For example, the presence of a child, human, or pet can be detected simply by a sensor device or even a smart camera, that can actually "see" and understand the object.

The Eyes and Ears for Watson & Nana

An electronic video smart camera system acts as the eyes and ears for NANA, and Watson. NANA an ai program passes environmental data to Watson which is capable of reading images, and processing these images in a similar manner as a human. With the use of environmental sensors, and other variables such as temperature, environmental data can be detected, read, and sent back to WATSON for intelligent processing in real time.

Connected to the Vehicle's Electronic System

Today, there are many different types of vehicles, and wide variety of manufacturers. Watson ai system can be initialized with information on every known vehicle known to mankind. This knowledge enables WATSON to connect to any vehicle's electronic system and remotely control the vehicle. For example, WATSON can function in the same manner a human does to operate a vehicle, such as turning on the air condition or controlling some other feature to modify a potentially dangerous environment.

NANA can also make decisions via WATSON such as automatically controlling the windows of a vehicle to ascertain the environment within a vehicle is safe for humans and pets. If a human or child is abandoned in a vehicle, then WATSON can call for help exactly like a human would. Such a humanistic task is readily available due to the powerful cognitive artificial intelligence of WATSON. Ongoing monitoring of the vehicle's internal environment guarantees "always on" safety of the vehicle minimizing fatalities.

Watson Visual Recognition, Smart Camera System for Visually Monitoring and Immediately Addressing Dangerous Vehicle Environments Facial recognition software or face recognition typically refers to software that can detect a human face. Often a step done before facial recognition or face perception, the process by which the human brain understands and interprets the face. Facebook and other sites use facial recognition software to detect faces contained on their website, and identify a specific face and place a name to identify that face. So a Facial recognition system is an automated system with the ability to identify individuals by their facial characteristics.

Watson Visual Recognition is a sub AI system within WATSON that makes it easy to extract thousands of images and detect any physical content. Custom AI modules can be built to detect for specific content in images and situations such as a person sleeping inside a car, or maybe even a child asleep in a vehicle in a dangerous environment, or a child left alone in a car.

Anything can be Inspected Visually by A.I.

WATSON can easily recognize any image, including videos, and real live situations in which it can detect changes within a vehicle. WATSON can understand an empty vehicle and a vehicle which has passengers, including children, infants, grown humans and/or pets or any moving matter which we as humans consider to be a life force.

By inspecting visually, WATSON, and/or NANA can make decisions and perform actions in real-time based upon what it is "seeing" in the images. It can sense danger and warn of alerts just like we as humans do. So in essence a virtual robot such as NANA can be used to assist in avoiding dangerous car environments.

Novel Features of the Invention

Artificial Intelligence, Robot Assistance, Immediate Repair of Dangerous Environment, Immediate Dispatch of Emergency Personnel, Pre-Warning of Hazardous Situations, and Real Time Detection of Problems Before they Occur Artificial Intelligence, including the use of the WATSON cognitive platform opens up many doors and methods to the present invention because many AI and artificial intelligence modules can be easily built without programming to realize and enhance the invention. As with machine learning, the invention and process keeps getting smarter and smarter with time as it learns from its mistakes.

However, there are novel features and advantages to the invention that can be easily recognized stemming from the use of WATSON's Artificial Intelligence and these novelties and advantages can be summarized as follows:

1. Artificial Intelligence is provided to sense any type of danger in a vehicle.
2. Any Vehicle internal environment can easily be connected to WATSON for continuous monitoring for dangerous conditions within a vehicle including excessive heated environments, and/or detection of poisonous gases such as carbon monoxide which normally result in a fatality.
3. Global real time monitoring using Satellite and Cellular networks.
4. Intelligent real time analysis of the vehicle's environment for predicting danger and taking swift action to provide immediate assistance to victims;
5. Robot assistance in the event humans are unavailable to address the dangerous vehicle environment.
6. Automated dispatch of emergency personnel to a problem related location.
7. Automated repair and action to repair the environment to safe conditions,
8. The ability to visually understand and to automatically respond to emergency situations without the aid of human intervention.

X. SUMMARY OF THE INVENTION

Nature and Substance of the Invention

Presented is an artificial intelligence interactive Emergency Response Robot for detecting hazardous conditions within a motor vehicle for the prevention of vehicle related deaths.

A Virtual Robot based on IBM's Watson cognitive supercomputing platform continuously monitors the internal and external environment of the motor vehicle and will automatically commence a rescue sequence in the event it detects a dangerous condition such as a child, or pet left abandoned in an overheated vehicle is detected.

When life threatening conditions are detected, the robot's ai simulates a human emergency responder to immediately dispatch assistance to the location and will assume control of the vehicle's electronic system to make adjustments in the environment.

The invention functions provides a universal method of connecting artificial intelligence to any vehicle for preserving lives and a method for speedy assistance to victims, and emergency response teams interacting in real time and will substantially decrease vehicle related deaths.

Purpose of the Invention

The purpose of the invention has a twofold nature: First the invention's purpose is to analyze and continuously monitor hazardous conditions within a vehicle to prevent vehicle related deaths and fatalities by quickly responding by dispatching emergency assistance to critical situations. The Second purpose is to provide a universal artificial intelligence solution for any vehicle that will provide immediate AI response to dangerous conditions within a vehicle with the use of Artificial Intelligence to actively respond to dangerous situations.

General Operation of the Invention

The general operation allows a artificial intelligence enabled Wireless Vehicle Data Recorder (Nana) to continuously record environmental data from the vehicle's atmosphere, such as temperature, video, audio data and other elements. This data is then forwarded to WATSON for processing and analysis for a dangerous condition. Watson returns data to Nana and If a dangerous conditions exist, Nana will place telephone calls to 911 Emergency personnel and enter conversational mode to interact with first responders similar to a human to eliminate the dangerous condition. The dangerous event is also broadcasted to social media for assistance in a rescue mission.

Objects and Advantages

1 The main objective is to provide a Universal Real Time Solution using Artificial Intelligence and IBM WATSON cognitive platform to Prevent Motor Vehicle Child Related Deaths resulting from over heated or dangerous environments within a vehicle.

2 Another object is to provide a real-time Android or Virtual Robot to monitor the environment of any motor vehicle and capable of making simultaneous emergency calls for reporting location and status of an emergency incident.

3 Another objective is to provide a real time communication system to Emergency Response Providers for immediate follow up when a child, adult, or pet is trapped within a dangerous vehicle environment.

4 Another main objective of the invention is to provide a real time precise GPS location of a vehicle in distress so that emergency responders can be dispatched to the physical site.

5 Another objective of the invention is to provide a real-time satellite or cellular connection for continuous network monitoring by the WATSON mainframe computer for immediate follow up in the event of a dangerous vehicle environment.

6 Another objective of the invention is to provide a stand along cyborg system for machine learning and monitoring and reporting problems within the system.

7 Another objective of the invention is to provide a method of electronically controlling a vehicle's air conditioning and heating system, windows, and other vital electronics in a vehicle for immediate action by artificial intelligence machines.

8 Another objective is to provide a real time video and smart camera system which uses face recognition that can be used by Watson or the Nana Cyborg for evaluating and monitoring the environment to prevent problems before they occur.

9 Another objective is to provide a simple "black box" Artificial Intelligence Universal Satellite Solution for tracking a transportation vehicle location.

10 Another Objective is to provide an independent ai cyborg or virtual robot that can communicate with first responders and other interested parties to resolve potential problems and active vehicle emergencies consisting of dangerous environments.

11 Another Objective of the invention is to provide an ai with knowledge of any vehicle whereas Watson can control the vehicle's electronic controls for making immediate adjustments for a safe environment.

REFERENCE NUMERALS—DRAWINGS

A complete understanding of the present invention may be obtained by reference to the accompanying drawings, and reference numerals when considered in conjunction with the subsequent, detailed description, in which the invention is comprised of the following elements:

| NO. | DRAWINGS - REFERENCE NUMERALS | THE FUNCTION OF THIS ELEMENT IS FOR: |
|---|---|---|
| 10 | Wireless Vehicle Data Recorder | Captures environmental data and transmits to WATSON for analysis. |
| 11 | Speaker | Providing loudspeaker and hearing instructions from NANA and users |
| 12 | Environment/Temperature Sensors | Analysis of Temperature and Hazardous Environments. |
| 13 | Microphone | For voice commands and general telecommunicating |
| 15 | WATSON - Cognitive Computing Platform | Artificial Intelligence For Analysis and Making Decisions. |
| 20 | SMART Camera (front) | Front Camera for Viewing Outside of a motor vehicle. |
| 22 | Rear Camera (back) | Rear Camera for viewing inside of a motor vehicle. |
| 25 | SIM CARD Cellular Interface | Connecting to a Cellular Network for Data Exchange to Watson |
| 30 | Nana Ai Robot Module | Independent A.I. Module for interactive communications |
| 35 | Satellite Interface Antenna | Interconnecting to Satellite Network for Satellite Communications |
| 40 | First Responder Network | Human First Responders Network for initiating emergencies. |
| 45 | Social Media Networks | Interfactive Communications to Watson and Social Networks |
| 50 | Public Emergency Broadast System | Used by A.I. For Broadcasting Hazaradous Incidents |
| 58 | Satellite Network | Network used to globally Connect A.I. To Watson and Nana |
| 60 | GPS Satellite Network | Used for computing physical location of distressed vehicle. |
| 70 | Internet | Used in interfacing Watson and Nana to Social Networks |
| 74 | Cellular Network | Cellular Network used to Connect To Watson and Nana |
| 80 | IBM's DeepQA Software Architecture | Cognitive Operating System used for WATSON and Nana |
| 90 | 3 TIER Artificial Intelligence MODEL | TRI-LEVEL AI MODULE FOR NANA IMPLEMENTATION |
| 100 | Smart Recognition Camera software (a.i.) | Visual View of Camera and computing environment status. |
| 110 | Window Controller Module (a.i) | A.I. module to control operation of Windows of a vehicle |

-continued

| NO. | DRAWINGS - REFERENCE NUMERALS | THE FUNCTION OF THIS ELEMENT IS FOR: |
| --- | --- | --- |
| 120 | Air Condition/Heater Controller Module (a.i.) | A.I. module for control of airconditioning/heatng system |
| 130 | Horn Blower Controller Module (a.i.) | A.I. for remote control of vehicle's horn for attention. |
| 140 | Headlight Controller Module (a.i.) | A.I. for remote activation of Vehicle's Lights for attention. |
| 150 | Broadcast Controller Module (a.i.) | A.I. for broadcastting emergencies to Social and EMS networks. |
| 160 | Cyborg Intervention Program (a.i) | A.I. for machine intervention to Social and First Responders |
| 170 | System Self Check (a.i.) | A.I. for checking status of the system |
| 180 | Check status of Vehicle (a.i.) | A.I. FOR ALERTING PERSONNEL ON THE STATUS OF THE SYSTEM |
| 200 | Broadcast Status of Vehicle (a.i) | A.i. Broadcast Status of Vehicle to First Responders |
| 210 | Conversational Mode Controller (a.i.) | A.I. For launching Watson's Conversation Mode to humans |
| 220 | Continuous Monitor Controller (ai) | A.I. For continously monitoring and reporting on environment. |

BRIEF DESCRIPTION OF THE DRAWINGS

FIG. 1 is an overall view of the Satellite/Cellular based, GPS enabled Emergency Response system, demonstrating how a Vehicle Data Recorder System (10) connects to IBM's WATSON cognitive platform and Android (30) to detect a dangerous environment, at which time the system automatically contacts First Responders, Social Media, and public broadcast for assistance.

FIG. 2 is a conceptual overview of tri-level artificial intelligence model based on IBM WATSON'S Transfer Learning for which the cyborg NANA is based and specifically demonstrates the three levels of industry knowledge and powerful capability of the Emergency Response Cyborg.

FIG. 3 is a conceptual view of the ai vehicle data recorder device demonstrating the relationship between the cyborg/android and how it connects to social media network and whereas the android in this diagram is actually ai based software to control the entire process.

FIG. 4 is a conceptual view of the NANA virtual robot communicating with human operators in real-time to dispatch emergency personnel to the scene of an emergency incident using GPS technology to locate the vehicle.

FIG. 5 is a conceptual view of the NANA virtual robot communicating social media, family members, and friends in real time to broadcast emergency and the scene accident incident to harness the power of the friends network to increase the chances of a speedy rescue.

FIG. 6 is a conceptual view of the NANA virtual robot transmitting internal vehicle data to WATSON by using internal environmental sensors to send the data over a wireless cellular or satellite network and interconnects to the backbone of the internet.

FIG. 7 is a conceptual view of how the NANA virtual robot utilizes a battery operated temperature sensor to access the vehicle's internal temperature and forwarding that information to WATSON for immediate analysis and follow up.

FIG. 8 is a conceptual view of how the NANA virtual robot functions independent of WATSON in the event of a disconnection from the WATSON mainframe and providing a backup of the Artificial Intelligence environment using NANA as the sole source of Artificial Intelligence in the event Watson disconnects from the configuration.

FIG. 9 is a conceptual view of how the NANA virtual robot starting a vehicle's engine to provide the convenience of air conditioning and other services that are used only when a vehicle is running.

FIG. 10 is a conceptual view of the wireless vehicle's data recorder system direct access and Nana black box vehicle data recorder which can be controlled exclusively by artificial intelligence ai software.

FIG. 11 is a conceptual view of the direct access to vehicle occupants for communication using the communication infrastructure system of the invention.

FIG. 12 is a conceptual view of interactivity and inter-communication with social media users to assist in an emergency whereas social media users can be helpful in the process of assisting in an emergency.

DETAILED DESCRIPTION OF SPECIFIC EMBODIMENTS

The basic steps of establishing the invention is relatively easy to one skilled in the art and employs eight (8) basic steps which can be implemented as defined below.

1. Establish the tri-level Artificial Intelligence environment using IBM's 3 Level AI MODEL used for the construction of the NANA ai cyborg in the implementation for continuous monitoring as this environment establish how the AI cyborg will operate and the AI model must be endowed with the capabilities of a medical and emergency professional. FIG. 1 provides and overview of the invention. No software programming is needed as in programmable systems because WATSON uses cognitive technology that understands complex general methods 2. Establish the NANA AI cyborg hardware with wireless sensors and smart cameras and microphone for collecting data from the vehicle's environment to be sent to WATSON for real time processing.

3. Establish the telecom devices for the vehicle which will allow the invention to intercommunicate with WATSON over a cellular and/or satellite network for global connectivity.

4. Establish a remote data center within Watson for long term storage of remote data which will be used by the vehicle's wireless data recorder system to hold the history of environmental data for later analysis.

5. Train the cyborg on how to interface with Watson enabled with remote environmental sensors, a remote data center, and data collection processor for the continual processing of data received from a vehicle to WATSON for intelligent analysis of the environment for deciding what action should be taken to effectuate an Emergency response.

6. Establish the camera system with internal microphones to interface with WATSON's ai recognition system which will be used by NANA and WATSON as a pair of eyes and ears for detecting dangerous environments using visual analysis.

7. Establish a global wireless network using satellite communications network and cellular network which will be used as a basis for international wireless transmissions to connect WATSON to the vehicle data recorder system, whereas this network is also used by NANA & WATSON for voice communications in the assistance of an emergency.

8. Connect the system to Emergency Response networks and social media networks for communication with humans.

Training the Nana Cyborg to Interface with Watson

In this implementation there is NO PROGRAMMING such as with normal processes of digital programmable computer systems of the present day.

This is a cognitive application, requiring no actual programming but based upon advanced AI Techniques of IBM's WATSON cognitive capabilities, including TRANSFER LEARNING to speed development of the AI and the overall solution. The NANA virtual robot/cyborg is based upon this concept of TRANSFER LEARNING, where it is able to receive the knowledge from the WATSON cognitive system via wireless communication links.

The NANA cyborg takes on the same characteristic as tri-level Artificial Intelligence environment using IBM's 3 Level AI MODEL described, and must be trained to collect data from the vehicle's environment, and transmit this data to WATSON for analysis.

NANA is an AI system that continuously learns and in the event of a disconnection on the network, it must be trained to operate and make decision, make telephone calls, and perform other tasks independently of WATSON, having the same capabilities as WATSON with the powers to reach out to social media and other human EMERGENCY RESPONSE NETWORKS.

A mass memory, smart camera, artificial intelligence, and wireless capabilities should be constructed into physical housing design of the CYBORG computing platform for implementation of the monitoring ROBOT must be developed. This is a simple wireless device as shown in FIG. 1 that can be mounted in the vehicle for monitoring purposes and can be built with cost effective materials in much the same manner as a cell phone or other modern day electronics.

This multi-functional wireless device which will serve as the artificial intelligence machine to gather information within the vehicle and remotely send to WATSON in real time for processing of the environment. This device is actually trained to interact with WATSON and human operators will get smarter and smarter with time as the result of its interaction with humans and the data it processes.

The mass memory is used to house the artificial intelligence system, and other data necessary to maintain the safety of the vehicle.

The cyborg AI and its sensor systems must be specifically configured to recognize the following:

(a) children
(b) pets
(c) adults, elderly persons, and,
(d) dangerous environments such as overheating, overcooling, dangerous gaseous states such carbon monoxide, fires, and,
(e) other humans seeking to assist in the process of responding to an emergency,
(f) any dangerous condition including any inappropriate human conditions occurring within the vehicle that may be hazardous to the environment for children, humans, and pets.

The Eyes and Ears of Nana and Watson—Smart Cameras

The cyborg is equipped with a pair of "eyes and ears" with the use of smart cameras and microphones built in to the design of the system. The cameras which are built in to the device are capable of transmitting visual information to WATSON for processing.

These images are used by WATSON and NANA to determine the status of the vehicle. In other words, these images and real time video captures are used by the cognitive system to analyze the status of the vehicle's environment in much the same way a human evaluates the same environment.

WATSON's cognitive capabilities when applied to video and sounds can be interpreted like a human for possible follow up when action is needed.

The Ears—the Microphone

The microphone of the device serves as the ears for "listening to" or broadcasting sounds to WATSON. Sound captured from a microphone can in much the same way as video be used to interpret the status of an environment and the people in it.

Review of the Main Drawings & Parts

There are various parts to the invention described on under "BRIEF DESCRIPTION OF THE DRAWINGS" section. The basic parts are numbered from 10 to 220 and form the basis of the invention. The descriptions therein are known to one skilled in the art and describes the function of each part.

Parts 10-22 are the main parts composed of the IBM SUPER COMPUTER HARDWARE and IBM's Deep QA Software Architecture respectively. The core artificial intelligence is stored here and this invention is based upon and possess all the characteristic of the super computing environment and the sub-systems rely upon this mainframe for high speed data processing of the environment of a vehicle.

Part 30 is the NANA ai cyborg virtual robot which is used in the implementation for monitoring of the vehicle, and it interconnects to WATSON in its normal operation. This virtual robot is an independent system and wireless device that can function on its on and make independent decisions of WATSON. This AI device is also capable of continuous learning about the environment and methods used to keep the environment safe. Staying connected to WATSON in real time allows the CYBORG to automatically learn new features from WATSON and its interactions with human end users.

Part 40 is the Vehicle Data Recorder which can be a part of the cyborg of part 30. This device or process is used for storing critical vehicle data in memory and is capable of connecting to both cellular and Satellite Networks in order to maintain communications between WATSON, the CYBORG, and the vehicle's environment.

Part 50 is the public emergency broadcast system which is used broadcast dangerous event. This is a networking system and any person skilled in the art understands that this configuration is required in order to deploy continuous communications to WATSON and the telecommunications network.

Part 70 is internet that can be used in the implementation for connecting to social media and other networks for assistance in the rescue process.

This process is part of the AI of the CYBORG because there is a need to collect information and transfer it to a source for processing. This process or program is a basically a software and ai module that can be a part of the normal processing of the invention.

It is how data travels across the network from the vehicle to WATSON and processed for wellness of the vehicle's internal environment.

Wireless Network/Internet Services

The establishment of the wireless network is necessary for communication between the internet, remote cyborg device and the WATSON cognitive environment.

This can be done by using a standard cellular network and/or Satellite network as shown in FIG. 1 of the drawings. It is precisely these networks that will be used to continuously receive the data from the vehicle and transmitted back to WATSON for analysis.

By establishing Satellite network connectivity to the device, then remote service of locating a troubled vehicle would be available anywhere in the world where the vehicle's GPS is known. This information is used by the CYBORG and WATSON to broadcast to EMERGENCY SUPPORT PERSONNEL and SOCIAL MEDIA with the precise location of the vehicle in distress. There is also a requirement to get the data from the vehicle to WATSON and this network is used for that purpose.

Precise GPS Network Technology

The design must be endowed with the precise GPS technology for computing the precise location of a potential emergency. The GPS information is used by the Cyborg and WATSON and the cyborg to determine the location of the vehicle for dispatch purposes.

Interactive Human Like Telephone Calls

Based on this design, the cyborg must be capable of placing multiple phone calls, and interacting with emergency service personnel that can assist in an emergency at the precise location. The ability to make multiple interactive phone calls to multiple recipients increases the chances of rescue. Interactive text messaging, social media messaging and broadcast are also basic communications the cyborg is capable of performing. Any communications skill normally used by a human is also available to the Watson and cyborg and can be automatically performed at the discretion of the cyborg or Watson.

First Responder/Social Media Networking/Public Broadcast Systems

This Artificial Intelligence system can communicate with First Responders, Social Medial Network, and Public Broadcast system in real-time in order to assist with a rescue. By communicating with First Responders, speedy help can be dispatch to the physical site of the rescue using precise GPS Technology.

Similar to a real human, WATSON can have multiple communications with human operator, 911 operators, in order to effect assistance to a troubled rescue site.

Social media is known and proven to be an excellent way to broadcast news and discover new important events and information.

Accordingly, this Cyborg must be connected to every known social media network to assist in a rescue. Broadcasting to Social Media allows the artificial intelligence system to connect to social media networks and communicate with social media users including potential friends and family of victims who may be able to assist in the rescue.

The probability of a successful rescue will increase when more people are aware of dangerous events in real time. WATSON, and NANA has the intrinsic ability to communicate with many individuals at one time, including texting, instant messaging, talking, and even video conferencing. A direct feed of an hazardous event can be broadcasted in real-time to social media and other public networks for immediate assistance in rescue missions.

Solar Charging to Guarantee Uptime

Solar charging to the vehicle's data recorder remote unit is necessary to guarantee uptime and service to the vehicle. This artificial intelligence apparatus will be powered by the vehicle's battery and it's own internal rechargeable batteries. However, the device will contain a small solar charging panel to continuously charge the internal batteries in the event the vehicle's battery source fails. Solar charging and ac/dc power will guarantee power to the system for proper ongoing operations with 99.9% uptime.

Other Important Guidelines to Follow in Building the Invention

To further clarify other important guidelines in building the invention. The following basic steps may be followed whereas one skilled in the art and knowledgeable of IBM Watson's cognitive environment would easily identify and recognize the basic steps as follows:

A. The telecommunications infrastructure, satellite, or cellular must be established in order to connect the IBM WATSON cognitive system to the vehicle's wireless data recorder system.

B. The Wireless Data Recorder unit must be endowed with cellular. satellite, and internet capabilities in order to enable interactive communications to the IBM WATSON mainframe and telecommunications network.

C. The AI of the implementation should be established with a knowledge base of the Emergency Rescue Industry and be given access to all remote channels of communication that a human would have access to in an emergency situation.

D. The A-I must be established with conversation mode in order to hold conversations in real time with human operators to assist in rescues.

E. IBM's Tri-level architecture should be used when building the Ai in order to keep each system unique, highly secured, and data specific for each deployment of the system.

F. The remote AI of the cyborg will be constantly allowed to learn from its interactions with WATSON and humans, and the current and past data environment such that it can independently learn and make decisions as to the safety of the vehicle's environment independent of WATSON.

What is claimed is:

1. A solar powered multilingual emergency response robot and interactive Artificial Intelligent (AI) system contained within a wireless vehicle data recorder for detecting hazardous conditions within a motor vehicle for prevention of vehicle related deaths, comprising:

the wireless vehicle data recorder including:

a solar power management system includes a solar charging panel configured to harvest solar power to charge internal batteries to provide continuous supply power to the data recorder;

an environmental sensor configured to detect vehicle's surrounding data and hazardous temperature data within the vehicle;

an exterior camera configured to capture an external environment of the vehicle;

an interior camera configured to capture an internal environment of the vehicle;

a Global Positioning System (GPS) configured to detect a current position of the vehicle and provide vehicle's physical location in response to an event of emergency;

a microphone configured to provide voice commands and general telecommunicating;

a speaker configured to provide audio instructions;

a wireless cellular communications network constructed to said vehicle for transmitting and receiving data to the artificial intelligence Artificial Intelligent (AI) system;

a wireless satellite communications network constructed to vehicle for transmitting and receiving of data to the artificial intelligence Artificial Intelligent (AI) system;

a storage memory configured to store all detected data and vehicle's location;

an Artificial Intelligence (AI) computer comprising a Virtual Robot based on IBM's Watson cognitive super-computing platform configured to receive all data transmitted from the vehicle data recorder and continuously monitors and analyze the internal and external environment of the motor vehicle and will automatically commence a rescue sequence in an event of dangerous condition inside the vehicle is detected; and an emergency first responder, in wireless communication with said AI computer, configured to said rescue sequence including type of dangerous condition and vehicle location data and thereby providing emergency responder dispatch to the vehicle location;

wherein a non-transitory computer-readable storage medium having internal Artificial Intelligent (AI) modules stored thereupon which, when executed by a processor, cause the processor to:

execute instructions to activate a solar powered Multifunctional Emergency Response Android with cognitive analysis and making rescue decisions based on the hazardous temperature data, the vehicle's environment and the vehicle's current location being exceed a threshold parameter;

providing communication between the vehicle data recorder to a network of human first responder for addressing emergencies and hazardous environments received by the artificial intelligence system;

broadcasting hazardous incidents to a public emergency broadcast systems to increase a chances of a successful rescue mission based at a vehicle physical location;

providing an interstellar space networking via satellite network and cellular network communicating to the said vehicle data recorder, configured to the artificial intelligence system for international global communications and connectivity of said vehicle data recorder;

providing an interconnecting link to satellite networks and general satellite networking for the configured to said wireless vehicle data recorder system;

computing a precise physical location of said vehicle data recorder and location of a distressed vehicle that needs emergency services;

capturing vehicle environmental data for transmission to said artificial intelligence Artificial Intelligence (AI) system for continuous data analysis of the vehicle's environment, global communications to end-users, and providing global positioning location for physical location of the vehicle in the event of an emergency, and for local storage of artificial intelligence Artificial Intelligence (AI) system modules;

interfacing the wireless data vehicle recorder to social networks and for general internet communications, voice, video and data communications using internet protocol;

providing an interstellar networking Artificial Intelligent (AI) system of the wireless vehicle data recorder for international global communications and connectivity of said wireless vehicle data recorder to a satellite network;

providing artificial intelligence system Artificial Intelligence (AI) system for cognitive analysis and interaction with said wireless vehicle data recorder in making rescue decisions based on vehicle's hazardous environment, physical location, and for providing interactive globa communications to human resources and emergency first responders available for dispatch to a predetermined physical location without human intervention;

providing the cellular network and data interconnectivity configured to for the wireless vehicle data recorder, and wireless exchange of data from the motor vehicle's environment to emergency first responders for immediate follow-up for preservation of human life;

enabling said artificial intelligence interactive communication with AI based super-computers, first responders, social media networks, and public emergency broadcast systems for preservation of life;

allowancing of cellular sim chips for connecting to the cellular network for transmission and exchange of data configured to external artificial Intelligence Artificial Intelligence (AI) systems;

providing a central cognitive operating system utilized as a basis for said wireless vehicle data recorder and ai configured to AI Artificial Intelligent (AI) modules providing the most advanced artificial intelligence Artificial Intelligence (AI) system platform for dispatching emergency personnel help without the need for human intervention;

making rescue decisions based on the vehicle's hazardous environment, location, and rescue resources available;

providing based on AI an onboard artificial intelligence (AI) system configured to perform multilingual interaction and real-time hazard detection ai model for establishing the general knowledge base of the artificial intelligence robot based on transfer learning enabling machine learning of a simulated human emergency responder, medical doctor, and related knowledge of the emergency response industry;

providing a fully trained ai Artificial Intelligence AI System capable of configured to remote visual viewing, and remote communications for determining the safety status of the physical environment of the motor vehicle for Artificial Intelligent (AI) ai processing and transmission of critical environmental data for immediate decision making regarding the safety status of a motor vehicle and occupants;

providing a trained ai Artificial Intelligent (AI) system for remotely controlling windows of vehicle by the said artificial intelligence system to third party human emergency responders for immediate dispatch of emergency first responder personnel;

providing a trained ai Artificial Intelligent (AI) system module for controlling the air conditioning and heating system of a motor vehicle and for making environmental changes automatically without the need of human intervention;

providing a trained ai Artificial Intelligent (AI) system for robotic and remote control of the motor vehicle's horn for getting attention to a distressed motor vehicle requiring emergency assistance;

providing a trained ai Artificial Intelligence (AI) System for controlling the headlights of the motion vehicle to draw attention to a distressed situation requiring emergency response assistance;

providing a trained ai Artificial Intelligent (AI) system for broadcasting emergencies to social networks, emergency first responder networks, and public broadcast systems for immediately identifying hazardous situation and immediate dispatch and emergency assistance to the physical location of the motor vehicle;

providing a trained ai Artificial Intelligent (AI) system for machine intervention for interactive communications to first responders, social network users, and for providing immediate robotic human-like interactive assistance with emergency responders when a hazardous environment is detected;

providing a trained ai Artificial Intelligence (AI) system for broadcasting emergencies to social networks, emergency first responder networks, and public broadcast systems;

providing the Artificial Intelligence (AI) system for controlling headlights of the motor vehicle to draw attention to a distressed situation requiring emergency response, while simultaneously communicating with a trained ai Artificial Intelligence AI system module for controlling the air conditioning and heating system of the motor vehicle for making environmental changes automatically, by said artificial intelligence system;

providing a trained ai Artificial Intelligence AI system for self-checking the status of the motor vehicle's environment and the ongoing well being and functionality of the vehicle data recorder and internal ai software systems; and providing a trained ai Artificial Intelligence AI system to broadcast the status of a motor vehicle's physical environment to emergency first responders, public emergency broadcast systems, and general authorized users while simultaneously providing interactive voice and data communication for purposes of enlisting emergency assistance to distressed vehicles requiring emergency assistance for the perseveration of human and animal life within said motor vehicle; for the preservation of human and pet life;

providing a fully trained ai Artificial Intelligence AI system for interacting with human users and executing commands necessary for a successful rescue effort while simultaneously allowing users and first responders to have human-like dialog with said artificial language in any language;

providing a broadcasting system for broadcasting hazardous incidents to public emergency broadcast systems to increase the chances of a successful rescue;

establishing interactive communications to social networks with said artificial intelligence Artificial Intelligent (AI) system while simultaneously interacting with users connected to international social networks, for providing a local, national, and international network to human first responders for addressing the motor vehicle's emergencies received by the artificial intelligence system Artificial Intelligent (AI) system;

providing a trained ai Artificial Intelligent (AI) system continuously monitoring and reporting on safety of the motor vehicle's internal and external environment, while simultaneously predicting failures, automatically fixing problems before they occur, and for triggering robotic control to eliminate any hazardous environments, for simultaneously providing telecommunications to human operators in the event of an uncontrolled and unexpected hazardous events for the preservation of life;

providing a trained ai Artificial Intelligence AI system for machine intervention to first responders, social network users, for providing immediate robotic human-like interactive assistance with emergency responders when a hazardous environment is detected;

providing an electro acoustic device as an audio system capable of configured to hearing output messages from said artificial intelligence system to emergency first responders, while simultaneously providing or continuous monitoring and capturing vehicle environmental data for continuous data analysis of the vehicle's environment;

providing an electromechanical input device for transmitting voice commands to the said artificial intelligence Artificial Intelligent (AI) system using a microphone use, while simultaneously responding to emergency responders via audio;

providing a wireless data recorder to be powered by AC/DC electrical power source, battery source and for capturing vehicle environmental data for ongoing real-time transmission to the artificial intelligence Artificial Intelligent (AI) system for uninterrupted power and real-time communication for ongoing operation of the wireless data recorder without the loss of electrical power;

providing a GPS receiver constructed to the wireless vehicle data recorder that is capable of configured to receiving GPS Data from GPS satellites for determining the physical position of the said wireless vehicle data recorder of the said motor vehicle while simultaneous providing ai Artificial Intelligence AI system analyzing the GPS satellite signals received from GPS satellites, for computing the exact physical position of said motor vehicle.

2. The solar powered multilingual emergency response robot and interactive Artificial Intelligent (AI) system in accordance with claim 1, comprises an AI software based robot for detecting hazardous environments within a motor vehicle for immediate dispatch of emergency response personnel for the preservation of life.

3. The solar powered multilingual emergency response robot and interactive Artificial Intelligent (AI) system in accordance with claim 1, wherein said means for capturing vehicle environmental data for transmission to an AI based super-computer for continuous data analysis of the vehicle's environment, global communications to end-users, and providing global positioning location for physical location of the vehicle in the event of an emergency, and for local storage of the Artificial Intelligent (AI) modules comprises a GPS/bluetooth enabled wireless vehicle data recorder system.

4. The solar powered multilingual emergency response robot and interactive Artificial Intelligent (AI) system in accordance with claim 1, wherein said means for sensing and analysis of vehicle temperature and hazardous environments within a motor vehicle for transmission to Artificial Intelligent (AI) super-computer for analysis and follow up comprises an environmental temperature sensor.

5. The solar powered multilingual emergency response robot and interactive Artificial Intelligent (AI) system in accordance with claim 1, wherein said means for Artificial Intelligent (AI) system for cognitive analysis and interaction with a AI based robot in making rescue decisions based on vehicle's environment, location, and resources available comprises a Watson cognitive computing platform.

6. The solar powered multilingual emergency response robot and interactive Artificial Intelligent (AI) system in accordance with claim 1, wherein said means for a front camera for AI viewing inside of a motor vehicle and utilized as a cognitive eye for AI analysis and remote viewing of the internal environment comprises an AI based front smart camera.

7. The solar powered multilingual emergency response robot and interactive Artificial Intelligent (AI) system in accordance with claim 1, wherein said means for a rear camera for AI viewing outside of motor vehicle and utilized as a cognitive eye for analysis of the external environment of a motor vehicle comprises an AI based rear smart camera.

8. The solar powered multilingual emergency response robot and interactive Artificial Intelligent (AI) system in accordance with claim 1, wherein said means for allowance of cellular sim chips for connecting to a cellular network for transmission and exchange of data to a super-computer comprises a sim card slot for interfacing to cellular networks.

9. The solar powered multilingual emergency response robot and interactive Artificial Intelligent (AI) system in accordance with claim 1, wherein said means for independent Artificial Intelligent (AI) system interactive communication with first responders, social media networks, and public emergency broadcast systems comprises a AI based cyborg robot module.

10. The solar powered multilingual emergency response robot and interactive Artificial Intelligent (AI) system in accordance with claim 1, wherein said means for interconnecting to satellite networks and general satellite networking for the wireless vehicle data recorder system comprises a satellite interface antenna.

11. The solar powered multilingual emergency response robot and interactive Artificial Intelligent (AI) system in accordance with claim 1, wherein said means for providing a local, national, and international network of human first responders for immediately addressing emergencies comprises a first responder network.

12. The solar powered multilingual emergency response robot and interactive Artificial Intelligent (AI) system in accordance with claim 1, wherein said means for establishing interactive communications to social networks interacting with users connected to international social networks comprise a social media network.

13. The solar powered multilingual emergency response robot and interactive Artificial Intelligent (AI) system in accordance with claim 1, wherein said means for broadcasting hazardous incidents to public emergency broadcast systems to increase the chances of a successful rescue comprises a public emergency broadcast system.

14. The solar powered multilingual emergency response robot and interactive Artificial Intelligent (AI) system in accordance with claim 1, wherein d means for interstellar networking of the wireless vehicle data recorder international global communications and connectivity of said wireless vehicle data recorder comprises a satellite network.

15. The solar powered multilingual emergency response robot and interactive Artificial Intelligent (AI) system in accordance with claim 1, wherein said means for computing the precise physical location of said vehicle data recorder and location of a distressed vehicle that requires emergency services comprises a GPS satellite network.

16. The solar powered multilingual emergency response robot and interactive Artificial Intelligent (AI) system in accordance with claim 1, wherein said means for interfacing to social networks and for general internet communications, voice, video and data communications using internet protocol comprises the internet.

17. The solar powered multilingual emergency response robot and interactive Artificial Intelligent (AI) system in accordance with claim 1, wherein said means for providing a cellular network and data interconnectivity for said wireless vehicle data recorder, comprises a wireless data connection for exchange of data from the physical environmental of the motor vehicle comprises a cellular network.

18. The solar powered multilingual emergency response robot and interactive Artificial Intelligent (AI) system in accordance with claim 1, wherein said means for providing the central cognitive operating system utilized as a basis for Artificial Intelligent (AI) system for providing the most advanced Artificial Intelligent (AI) platform comprises a deep QA software architecture.

19. The solar powered multilingual emergency response robot and interactive Artificial Intelligent (AI) system in accordance with claim 1, wherein said means for providing an onboard artificial intelligence (AI) system configured to perform multilingual interaction and real-time hazard detection AI model for establishing the general knowledge of said robot using transfer learning enabling machine learning of simulating emergency responders, medical doctor, and related knowledge of the emergency response industry comprises a 3-tier Artificial Intelligent (AI) system model.

20. The solar powered multilingual emergency response robot and interactive Artificial Intelligent (AI) system in accordance with claim 1, wherein said means for providing a fully trained AI configured to, remote visual viewing, and determining the safety status of the physical environment of a motor vehicle for AL processing and transmission to a AI based super-computer for immediate decision making regarding the safety status of a motor vehicle and occupants comprises a smart recognition camera module.

21. The solar powered multilingual emergency response robot and interactive Artificial Intelligent (AI) system in accordance with claim 1, wherein said means for providing a trained AI for remotely controlling windows of vehicle or remote control by third party human emergency responders comprises a window controller module.

22. The solar powered multilingual emergency response robot and interactive Artificial Intelligent (AI) system in accordance with claim 1, wherein said means for providing a trained AI module for controlling the air conditioning and heating system of a motor vehicle and for making environmental changes automatically, and remote access to emergency response personnel comprises an air conditioner heater controller module.

23. The solar powered multilingual emergency response robot and interactive Artificial Intelligent (AI) system in accordance with claim 1, wherein said means for providing a trained AI for robotic and remote control of a motor vehicle's horn for getting attention to a distressed motor vehicle comprises a horn blower controller module.

24. The solar powered multilingual emergency response robot and interactive Artificial Intelligent (AI) system in accordance with claim 1, wherein said means for providing an AI for controlling the headlights of a motor vehicle to draw attention to a distressed situation requiring emergency response comprises a headlight controller module.

25. The solar powered multilingual emergency response robot and interactive Artificial Intelligent (AI) system in accordance with claim 1, wherein said means for providing a trained AI for broadcasting emergencies to social networks, emergency first responder networks, and public broadcast systems comprises a broadcast controller AI module.

26. The solar powered multilingual emergency response robot and interactive Artificial Intelligent (AI) system in accordance with claim 1, wherein said means for providing a trained AI for machine intervention to first responders, social network users, for providing immediate robotic human-like interactive assistance with emergency responders when a hazardous environment is detected comprises a cyborg intervention ai AI module.

27. The solar powered multilingual emergency response robot and interactive Artificial Intelligent (AI) system in accordance with claim 1, wherein said means for providing a trained AI module for self-checking the status of the environment and the ongoing well being and functionality of the vehicle data recorder and internal AI software systems comprises a self checking system for checking the status of emergency response system.

28. The solar powered multilingual emergency response robot and interactive Artificial Intelligent (AI) system in accordance with claim 1, wherein said means for provided a trained AI to broadcast the status of a motor vehicle's physical environment to emergency first responders, public emergency broadcast systems, and general authorized users comprises a broadcast status of any kind of motor vehicle.

29. The solar powered multilingual emergency response robot and interactive Artificial Intelligent (AI) system in accordance with claim 1, wherein said means for providing a fully trained AI for interacting with human users and executing voice commands necessary for a successful rescue effort and allowing users and first responders to have dialog with the AI system in any language, comprises an interactive Artificial Intelligent (AI) conversational mode controller.

30. The solar powered multilingual emergency response robot and interactive Artificial Intelligent (AI) system in accordance with claim 1, wherein said means for providing a trained AI continuously monitoring and reporting on safety of the motor vehicle's internal and external environment, predicting failures, automatically fixing problems before they occur, and for triggering a cyborg for robotic control to eliminate a hazardous environments and for providing telecommunications to human operators in events of an uncontrolled hazardous event comprises a continuous monitor controller.

31. The solar powered multilingual emergency response robot and interactive Artificial Intelligent (AI) system in accordance with claim 1, wherein said means for providing electro acoustic device system for hearing output messages from the emergency audio response robot and emergency first responders comprises a loud speaker.

32. The solar powered multilingual emergency response robot and interactive Artificial Intelligent (AI) system in accordance with claim 1, wherein said means for providing an electromechanical device to transmit voice commands for responding to emergency responders comprises a microphone.

33. The solar powered multilingual emergency response robot and interactive Artificial Intelligent (AI) system in accordance with claim 1, wherein said means for providing solar power management to the wireless vehicle data recorder system and independent power source for keeping internal batteries charge and providing continuous power to said wireless vehicle data recorder system comprises a solar panel charging system for keeping the internal batteries fully charged for continuous operation without interruption.

34. The solar powered multilingual emergency response robot and interactive Artificial Intelligent (AI) system in accordance with claim 1, wherein said means for providing the motor vehicle's wireless data recorder to be powered by ac/dc electrical power comprises an ac/dc power port.

35. The solar powered multilingual emergency response robot and interactive Artificial Intelligent (AI) system in accordance with claim 1, wherein said means for providing GPS coordinates that can determine physical position of the wireless vehicle data recorder and vehicle by analyzing the GPS satellite signals it receives from GPS satellites comprises a GPS receiver.

\* \* \* \* \*